United States Patent
Parkkila et al.

(10) Patent No.: US 12,368,720 B2
(45) Date of Patent: Jul. 22, 2025

(54) MESSAGING AMONG MESSAGE GROUPS IN A MESH NETWORK

(71) Applicant: ITRON, INC., Liberty Lake, WA (US)

(72) Inventors: Tommi Petteri Parkkila, Cary, NC (US); Matthew Rockey, Fishers, IN (US)

(73) Assignee: ITRON, INC., Liberty Lake, WA (US)

( * ) Notice: Subject to any disclaimer, the term of this patent is extended or adjusted under 35 U.S.C. 154(b) by 156 days.

(21) Appl. No.: 17/933,007

(22) Filed: Sep. 16, 2022

(65) Prior Publication Data
US 2024/0098093 A1  Mar. 21, 2024

(51) Int. Cl.
 *H04L 9/40* (2022.01)
 *H04L 51/212* (2022.01)
 *H04L 67/12* (2022.01)

(52) U.S. Cl.
 CPC .......... *H04L 63/104* (2013.01); *H04L 51/212* (2022.05); *H04L 63/0428* (2013.01); *H04L 63/20* (2013.01); *H04L 67/12* (2013.01)

(58) Field of Classification Search
 CPC . H04L 63/104; H04L 51/212; H04L 63/0428; H04L 63/20; H04L 67/12; H04L 51/214; H04L 12/185
 See application file for complete search history.

(56) References Cited

U.S. PATENT DOCUMENTS

| | | | |
|---|---|---|---|
| 8,310,973 B2 | 11/2012 | Garofalo | |
| 2004/0111612 A1* | 6/2004 | Choi | H04L 63/0421 713/163 |
| 2005/0188039 A1 | 8/2005 | Charters et al. | |
| 2012/0135723 A1 | 5/2012 | Ramo et al. | |
| 2013/0067211 A1 | 3/2013 | Farrugia et al. | |

(Continued)

FOREIGN PATENT DOCUMENTS

| | | |
|---|---|---|
| EP | 2 475 138 A1 | 7/2012 |
| WO | 2006/068675 A1 | 6/2006 |

OTHER PUBLICATIONS

Brown et al., U.S. patent application entitled, "Enforcing Access to Endpoint Resources", U.S. Appl. No. 17/213,145, filed Mar. 25, 2021, 47 pages.

(Continued)

*Primary Examiner* — Sm A Rahman
(74) *Attorney, Agent, or Firm* — Artegis Law Group, LLP

(57) ABSTRACT

Various embodiments disclosed herein provide techniques for messaging among message groups associated with agents executing on nodes of a mesh network. A messaging application executing on a node of the mesh network receives a request from an agent executing on the first node to join a message group; verifies that a policy permits the agent to join the message group; adds the agent to the message group; receives, from the agent, content for a message for the message group; and transmits the message to a second messaging application of a second node of the mesh network for delivery to an agent that is executing on the second node and that is included in the message group. In various embodiments, the messaging application receives, from another node of the mesh network, a second message for the message group, and delivers content from the second message to the agent.

20 Claims, 13 Drawing Sheets

(56) References Cited

U.S. PATENT DOCUMENTS

| | | | |
|---|---|---|---|
| 2013/0190943 A1* | 7/2013 | Wester | F24F 11/46 |
| | | | 700/297 |
| 2016/0345317 A1* | 11/2016 | Levesque | H04W 40/02 |
| 2018/0019869 A1 | 1/2018 | Savage et al. | |
| 2018/0165945 A1 | 6/2018 | McClendon et al. | |
| 2018/0227239 A1 | 8/2018 | Srinivasan et al. | |
| 2023/0081708 A1 | 3/2023 | Szigeti et al. | |

OTHER PUBLICATIONS

Extended European Search Report for Application No. 23197776.0 dated Mar. 20, 2024.
Extended European Search Report for Application No. 23195826.5 dated Feb. 7, 2024.
Non Final Office Action received for U.S. Appl. No. 17/933,011 dated Aug. 21, 2024, 23 pages.
Final Office Action received for U.S. Appl. No. 17/933,011 dated Mar. 17, 2025, 32 pages.
Non Final Office Action received for U.S. Appl. No. 17/933,011 dated Jun. 17, 2025, 29 pages.

* cited by examiner

MESSAGING AMONG MESSAGE GROUPS IN A MESH NETWORK

FIELD OF THE VARIOUS EMBODIMENTS

The various embodiments relate generally to mesh networks and, more specifically, to messaging among message groups in a mesh network.

BACKGROUND

Description of the Related Art

In mesh networks, one or more nodes communicate using one more communication media, such as various wired connections (e.g., Ethernet, power line communication (PLC), or the like) and/or wireless connections (e.g., WiFi®, Bluetooth®, radiofrequency (RF) communication, or the like). Many such mesh networks are self-organized as peer-to-peer networks, in which connections are established in response to the nodes discovering one another rather than based on a predefined topology or a centralized server.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
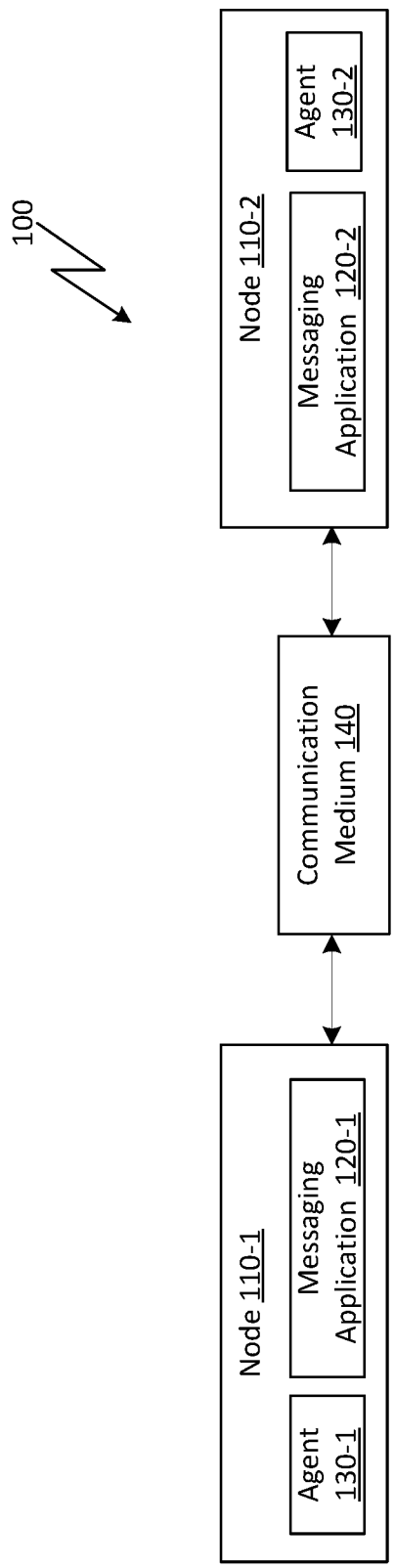
FIG. 1A illustrates an example of a computer system, according to various embodiments.

In the following description, numerous specific details are set forth to provide a more thorough understanding of the various embodiments. However, it will be apparent to one of skilled in the art that the inventive concepts may be practiced without one or more of these specific details.

In some mesh networks, nodes of the mesh network execute one or more agents, such as one or more software applications that provide various services. For example, in an infrastructure including power meters that are nodes in a mesh network and that measure power supplied to various consumers, agents executing on these power meters can measure power delivered by the power meter over a period and can communicate the information to other nodes for aggregation and transmission to a power utility or provider. The agents can gather information on behalf of various consumers (e.g., various consumers of power delivery services) and/or can collect, receive, and/or transmit various types of information (e.g., power consumption information and/or consumer information). In various embodiments, a given node can operate a communication interface that transmits data on behalf of the agents executing on the node and/or receives information from agents executing on other nodes. Further, the communication interface of one or more nodes can transmit data to and/or from the power utility or provider.

One challenge with these mesh networking scenarios is the distribution of the information. As a first example, a node can request delivery of a message including sensitive data, such as the identities of consumers and/or resource consumption information. If the communication interface were to broadcast the message to all other nodes of the mesh network, the message could be inadvertently transmitted to nodes and/or agents that should not have access to the sensitive information. That is, a broadcast message may be inappropriate for the transmission of various types of data or information. As a second example, an agent can request delivery of a message to other agents that are associated with different consumers. If the communication interfaces of the nodes transmit the message to the other nodes, communication can occur between agents that should not be permitted to communicate (e.g., the power meter at Consumer A's house receives billing information from Consumer B's power meter). As a third example, an agent can request delivery to a particular group of agents, such as all agents that are associated with the same entity (e.g., all agents that are associated with a particular utility company). In order to fulfill this request, the agent and/or communication interface might need to keep track of which other agents are part of the group. Tracking the membership of groups can require additional communication among the nodes. In various embodiments, the nodes communicate over communication media with limited bandwidth, and limiting the number of exchanged messages can conserve bandwidth that can be used for other messages. Further, in some embodiments, nodes operate using battery power, and the exchange of additional messages regarding group membership of agents can reduce the battery life of the nodes.

As discussed below, one solution to the above challenges is to execute a messaging application on the nodes of the mesh network. In various embodiments, the messaging application is operable to receive a request from an agent executing on the first node to join a message group; verify that a policy permits the agent to join the message group; add the agent to the message group; receive, from the agent, content for a message for the message group; and transmit the message to a second messaging application of a second node of the mesh network for delivery to an agent that is executing on the second node and that is included in the message group.

Additionally, in various embodiments, the messaging application is operable to receive a request from an agent executing on the first node to join a message group; verify that a policy permits the agent to join the message group; add the agent to the message group; receive, from a second messaging application executing on a second node of the mesh network, a message for the message group; and deliver content from the message to the agent.

Moreover, in various embodiments, the messaging application is operable to receive content for a first message from an agent executing on the node, the first message being for a first message group; and transmits a composite message to a second node of the mesh network, the composite message including the first message for the first message group and a second message for a second message group.

Furthermore, in various embodiments, the messaging application is operable to obtain a request from an agent executing on the node to join a first message group; determine whether the agent is permitted, by a policy, to join the first message group; in response to determining that the agent is permitted, by the policy, join the first message group, subscribe the agent to the first message group; obtain a first message from the agent, wherein the first message is to be provided to one or more agents that are to the first message group; and send the first message to a second messaging application of another node of the mesh network to be provided to one or more agents that are subscribed to the first message group.

Further embodiments provide, among other things, a system and a non-transitory computer-readable medium configured to implement one or more of the methods set forth above.

At least one technical advantage of the disclosed techniques is that, with the disclosed techniques, nodes are able to manage the transmitting and receiving of messages among agents executing on the nodes by associating the agents with message groups so that only the agents that are permitted to receive messages. Additionally, the disclosed techniques allow nodes to manage the associations between agents and message groups in a decentralized manner. The decentralization reduces the overhead and improves the reliability of the mesh network. Additionally, the disclosed techniques allow nodes to transmit multiple message in one composite message, which reduces the time, bandwidth, and power required to transmit messages among the nodes for delivery to the message groups.

Messaging Applications

FIG. 1A illustrates an example of a computer system 100, according to various embodiments. As shown in FIG. 1A, computer system 100 includes, without limitation a node 110-1 and a node 110-2 coupled together via a communication medium 140. As discussed in additional detail in reference to FIGS. 1B and 1C, in various embodiments node 110-1 and node 110-2 are nodes of a mesh network that are operable to communicate with each other and with other nodes in the mesh network via communication medium 140. Node 110-1 includes, without limitation, an agent 130-1 and a messaging application 120-1. Node 110-2 includes, without limitation, an agent 130-2 and a messaging application 120-2. According to the techniques discussed in greater detail below in FIGS. 1A-8, Agent 130-1 uses messaging application 120-1 to send messages to and receive messages from other agents operating on other nodes of computing system 100, such as agent 130-2. Similarly, agent 130-2 uses messaging application 120-1 to send messages to and receive messages from agents operating on other nodes of computing system 100, such as agent 130-1. The various messaging applications 120 transmit the messages to the messaging applications 120 on other nodes 110 in computing system 100 using communication medium 140.

Figure 1B:
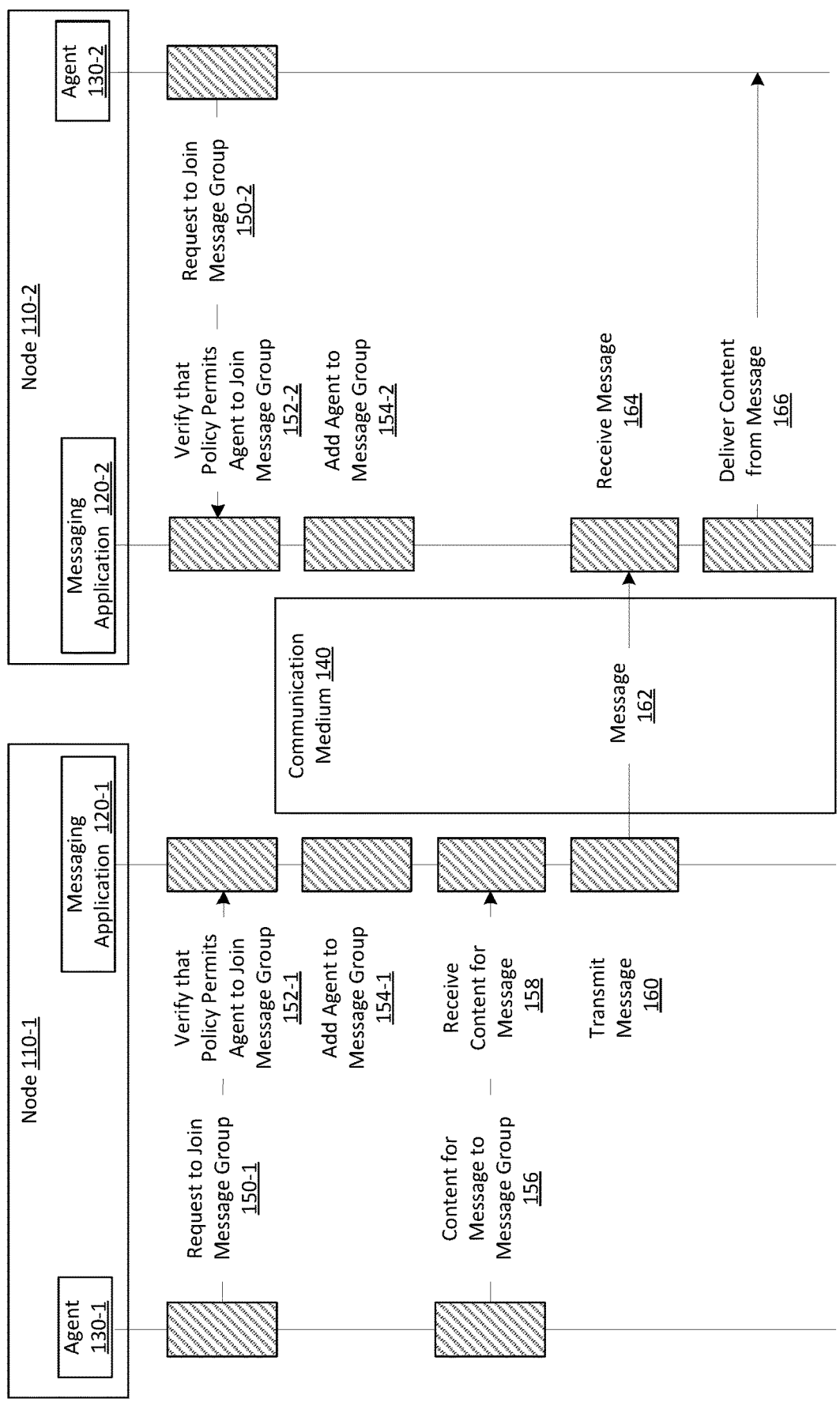
FIG. 1B illustrates an example messaging flow diagram showing messaging among agents of a mesh network, according to various embodiments.

FIG. 1B illustrates an example messaging flow diagram showing messaging among agents of a mesh network, according to various embodiments. Although the interactions between the two nodes are shown in an order, persons skilled in the art will understand that the interactions may be performed in a different order, interactions may be repeated or skipped, and/or may be performed by components other than those described in FIG. 1B.

As shown in FIG. 1B, two nodes 110-1, 110-2 of a mesh network are connected by communication medium 140. The communication medium 140 can be, for example, a wired connection (e.g., an Ethernet connection or a power line communication connection) or a wireless connection (e.g., a WiFi® connection or a Bluetooth® connection). Although not shown, the nodes 110-1, 110-2 can be in communication with other nodes of the mesh network by the same communication medium 140 or different communication media. As shown, each node 110-1, 110-2 respectively executes at least one agent 130-1, 130-2, respectively, that performs functions such as (without limitation) monitoring, analyzing, collecting, storing, transmitting, and/or receiving data. Also, each node 110-1, 110-2 respectively executes a messaging application 120-1, 120-2 that enables the nodes 110-1, 110-2 to exchange messages with each other and, optionally, with other nodes 110 of the mesh network.

Messaging application 120-1 executing on node 110-1 receives, from agent 130-1, a request 150-1 to join a message group. In various embodiments, the message group includes a specific set of agents 130 executing on various nodes 110 that exchange messages, such as agents 130 that provide a utility on behalf of a client or that measure a use of the utility by the particular client. As an example, the message group can be limited to agents 130 that are associated with the particular client and can exclude agents 130 that are not associated with the particular client. Alternatively or additionally, in various embodiments, the message group includes an exchange of messages including a specific type of data, such as messages exchanged by a set of agents 130 involving data that is associated with a particular client and excludes other types of data that are associated with other clients.

In response to the request 150-1 to join the message group, messaging application 120-1 performs a step 152-1 of verifying that a policy permits agent 130-1 to join the message group. In various embodiments, the policy indicates one or more criteria of agents 130 that are permitted to join the message group. If the messaging application 120-1 determines that the policy permits agent 130-1 to join the message group, the messaging application 120-1 performs a step 154-1 of adding the agent 130-1 to the message group. In various embodiments, the messaging application 120-1 updates a list stored by the messaging application 120-1 that indicates the agents 130 executed on the node 110-1 that are included in the message group. If the messaging application 120-1 determines that the policy does not permit agent 130-1 to join the message group, the messaging application 120-1 refrains from adding agent 130-1 to the message group.

After being added or subscribed to the message group, agent 130-1 performs a step 156 of providing, to messaging application 120-1, content for a message for the message group. Messaging application 120-1 performs a step 158 of receiving the content for the message from the agent 130-1. Messaging application 120-1 performs a step 160 of transmitting the message from node 110-1 to node 110-2 via the communication medium 140 as a message 162.

In various embodiments, node 110-1 includes one or more agents 130 that generate content for messages for the message group and do not receive delivery of messages for the message group. In various embodiments, node 110-2 includes one or more agents 130 that receive delivery of messages for the message group. In various embodiments, at least one agent 130 is included in two or more message groups. In various embodiments, at least one node 110 includes an agent 130 that is not included in any message group.

Figure 8:
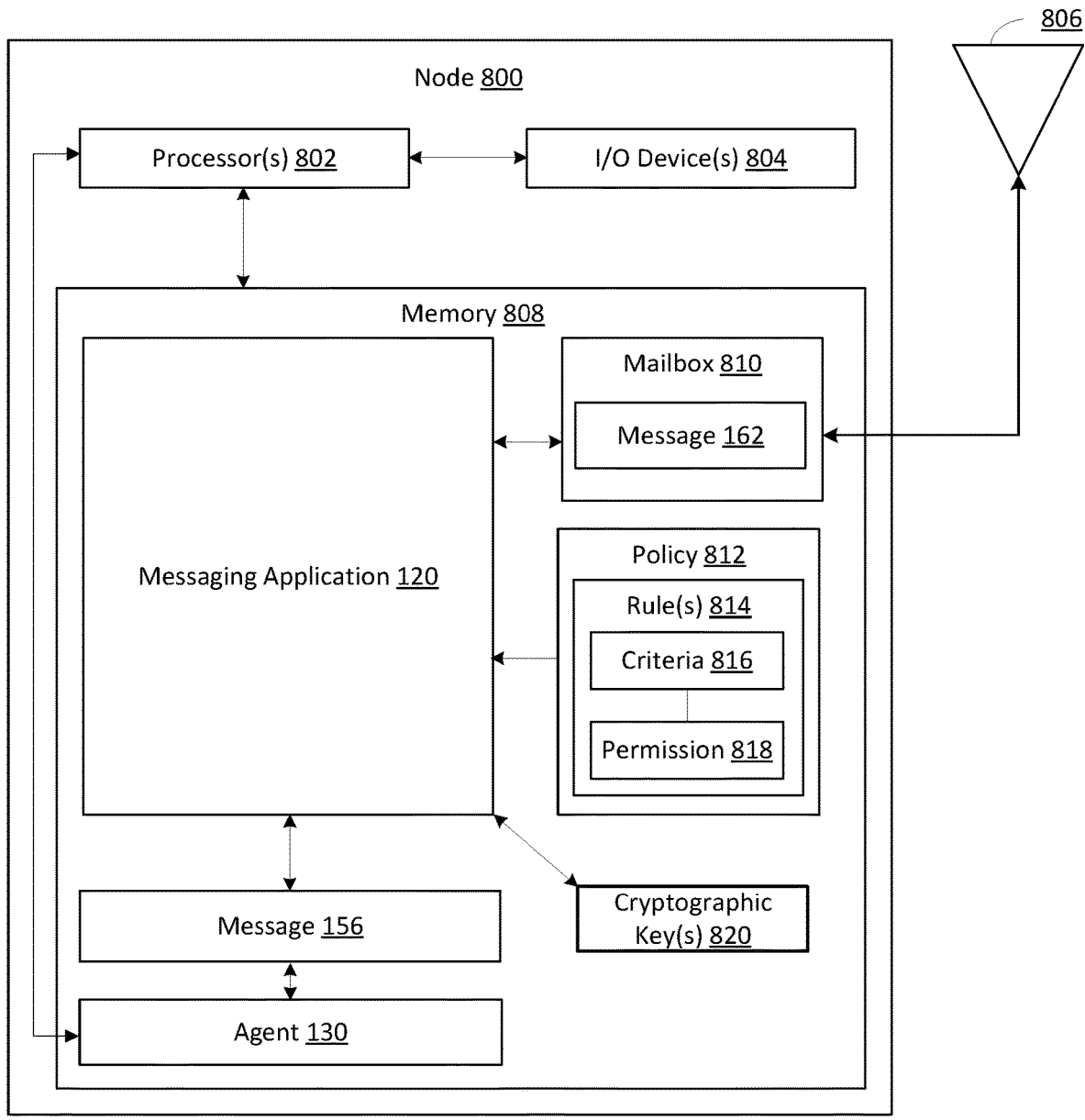
FIG. 8 illustrates an exemplary node that can be included in a mesh network 6, according to various embodiments.

While not shown in FIG. 1B, in various embodiments, messaging application 120-1 transmits the message 162 by enqueuing the message 162 in a mailbox (e.g., a mailbox 810 in reference to FIG. 8). The messaging application 120-1 can dequeue one or more messages 162 enqueued in the mailbox and transmit the dequeued one or more messages 162 to one or more other nodes 110 of the mesh network.

While not shown in FIG. 1B, in various embodiments, messaging application 120-1 can verify that the policy (e.g., a policy 812 in reference to FIG. 8) permits the message 162 to be transmitted to the message group. If agent 130-1 is not permitted, by the policy, to send the message 162 to the message group, the messaging application 120-1 refrains from transmitting the message 162 to the second node 110-2.

While not shown in FIG. 1B, in various embodiments, rather than transmitting the message 162 in plaintext, messaging application 120-1 transmits to messaging application 120-2 an encrypted message, such as a cryptographically encoded message in which the content for the message is encrypted with a cryptographic key that is associated with the message group. Messaging application 120-1 can encrypt the content for the message with the cryptographic key that is associated with the message group. Messaging application 120-2 can decrypt the encrypted message 162 with the cryptographic key that is associated with the message group to generate the content for the message for delivery. Various examples of cryptographic techniques that may be employed in various embodiments are discussed herein in reference to FIGS. 3A and 3B.

Messaging application 120-2 executing on node 110-2 receives, from agent 130-2, a request 150-2 to join the same message group. In response to the request 150-2, messaging application 120-2 performs a step 152-2 of verifying that a policy permits agent 130-2 to join the message group. If the messaging application 120-1 determines that the policy permits agent 130-1 to join the message group, the messaging application 120-1 performs a step 154-1 of adding or subscribing the agent 130-1 to the message group. In various embodiments, the messaging application 120-2 updates a list stored by the messaging application 120-2 that indicates the agents 130 executed on the node 110-2 that are included in the message group. If the messaging application 120-2 determines that the policy does not permit agent 130-2 to join the message group, the messaging application 120-2 refrains from adding or subscribing agent 130-2 to the message group.

Messaging application 120-2 performs a step 164 of receiving the message 162 transmitted by messaging application 120-1 via the communication medium 140. The messaging application 120-2 perform a step 166 of delivering the message 162 to the agent 130-2 that has been added or subscribed to the message group.

While not shown, in various embodiments, messaging application 120-1 can verify that the policy permits delivery of the message 162 to the message group. The messaging application 120-1 performs the step 166 of delivering the content from the message 162 to the agent 130-2 only after verifying that the policy permits the message 162 to be delivered to the agent 130-2. Alternatively or additionally, while not shown, in various embodiments, messaging application 120-1 transmits, and messaging application 120-2 receives, an encrypted message 162 in which the content from the message 162 has been encrypted with a cryptographic key that is associated with the message group, and the messaging application 120-2 decrypts the encrypted message using the cryptographic key in order to deliver the content from the message 162 to the agent 130-2.

While not shown, in various embodiments, messaging application 120-1 receives a request from agent 130-1 to create a message group, and in response, the messaging application 120-1 creates the message group. Messaging application 120-1 can also add or subscribe agent 130-1 to the created message group without requiring a separate request 150-1 from agent 130-1 to join the created message group. Messaging application 120-1 can verify that a policy permits agent 130-1 to create the message group. In response to a determination that the policy does not permit agent 130-1 to create the message group, messaging application 120-1 can refrain from creating the message group.

Figure 1C:
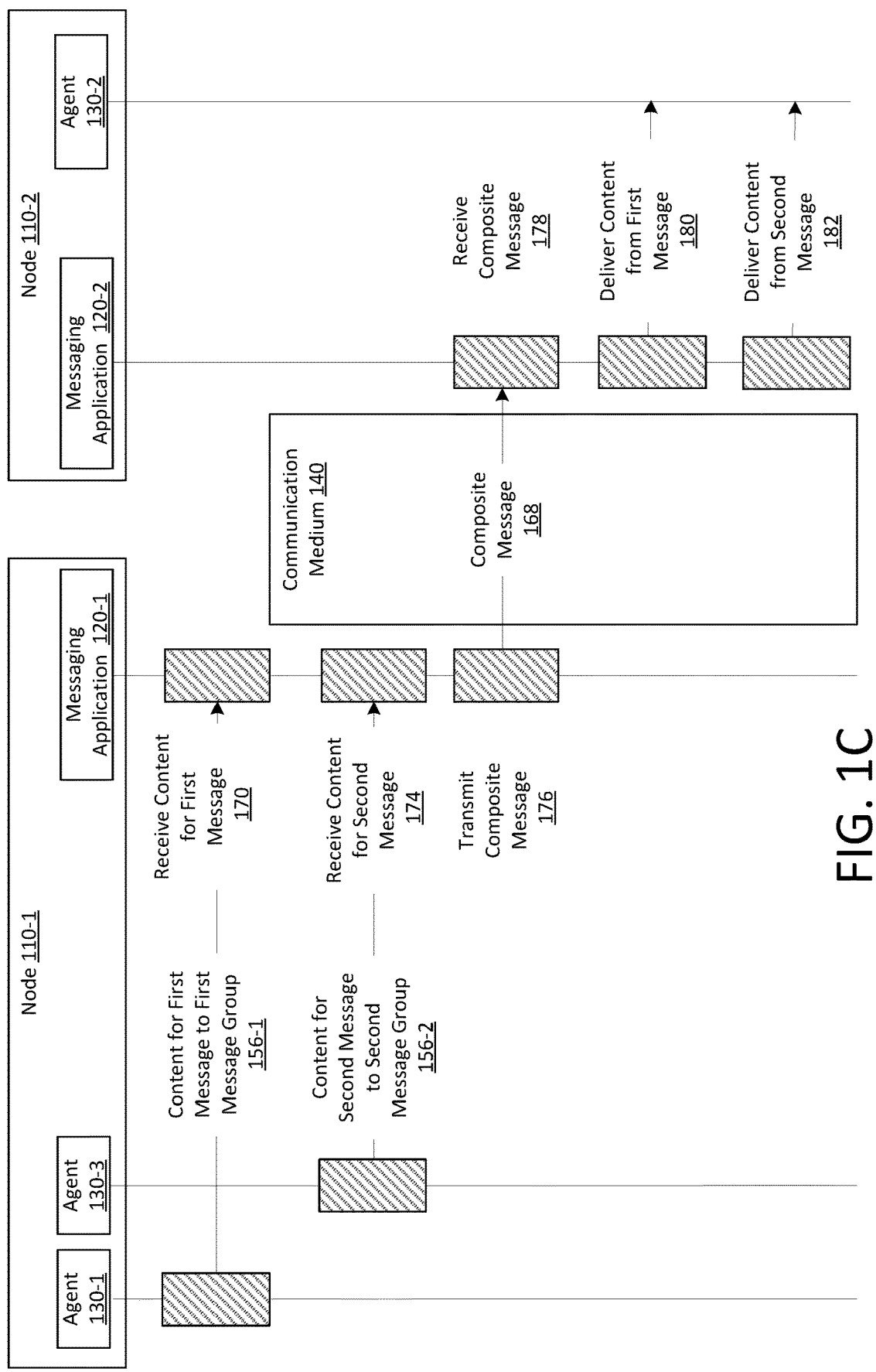
FIG. 1C illustrates another example messaging flow diagram showing messaging among agents of a mesh network, according to various embodiments.

FIG. 1C illustrates another example messaging flow diagram showing messaging among agents of a mesh network, according to various embodiments. Although the interactions between the two nodes are shown in an order, persons skilled in the art will understand that the interactions may be performed in a different order, interactions may be repeated or skipped, and/or may be performed by components other than those described in FIG. 1C. In various embodiments, at least some portions of the messaging flow diagram of FIG. 1C are used in combination with the messaging flow diagram of FIG. 1B. Alternatively or additionally, in various embodiments, at least some portions of the messaging flow diagram of FIG. 1B are used in combination with the messaging flow diagram of FIG. 1C.

As shown in FIG. 1C, two nodes 110-1, 110-2 of a mesh network are connected by communication medium 140. The communication medium 140 can be, for example, a wired connection (e.g., an Ethernet connection or a power line communication connection) or a wireless connection (e.g., a WiFi® connection or a Bluetooth® connection). Although not shown, the nodes 110-1, 110-2 can be in communication with other nodes of the mesh network by the same communication medium 140 or different communication media. Node 110-1 executes two agents 130-1, 130-3, and node 110-2 executes an agent 130-2, wherein the agents perform functions such as (without limitation) monitoring, analyzing, collecting, storing, transmitting, and receiving data. At least agent 130-2 is associated with a first message group. Also, each node 110-1, 110-2 respectively executes a messaging application 120-1, 120-2 that enables the nodes 110-1, 110-2 to exchange messages with each other and, optionally, with other nodes 110 of the mesh network.

Agent 130-1 performs a step 156-1 of providing, to messaging application 120-1, content for a first message for a first message group. Messaging application 120-1 performs a step 170 of receiving the content for first message. In various embodiments, agent 130-1 is included in the first message group, or at least is permitted, by a policy, to send messages to the first message group. Alternatively or additionally, in various embodiments, the content for the first message includes data that is permitted, by a policy, to be delivered to the first message group.

Agent 130-3 performs a step 156-2 of providing, to messaging application 120-1, content for a second message to a second message group. Messaging application 120-1 performs a step 174 of receiving the content for the second message. In various embodiments, agent 130-2 is included in the second message group, or at least is permitted, by a policy, to send messages to the second message group. Alternatively or additionally, in various embodiments, the content for the second message includes data that is permitted, by a policy, to be delivered to the first message group.

Messaging application 120-1 performs a step 176 of transmitting a composite message 168 to node 110-2 via the communication medium 140. The composite message includes the first message for the first message group and the second message for the second message group.

While not shown, in various embodiments, messaging application 120-1 performs a step of verifying that agent 130-1 is permitted, by a policy, to send the first message to the first message group. If agent 130-1 is not permitted, by the policy, to send the first message to the first message group, the messaging application 120-1 refrains from including the first message in the composite message 162 and refrains from transmitting the first message to another node 110 of the mesh network. Similarly, in various embodiments, messaging application 120-1 performs a step of verifying that agent 130-2 is permitted, by a policy, to send the second message to the second message group. If agent 130-2 is not permitted, by the policy, to send the second message to the second message group, the messaging application 120-1 refrains from including the second message in the composite message 162 and refrains from transmitting the second message to another node 110 of the mesh network.

Messaging application 120-2 performs a step 178 of receiving the composite message 168 from node 110-1 via the communication medium 140. Messaging application 120-2 performs a step 180 of delivering the content from the first message included in the composite message 168 to the agent 130-2, which is associated with the first message group. While not shown, in various embodiments, messaging application 120-2 verifies that the agent 130-2 is permitted, by a policy, to receive the first message. If the messaging application 120-2 determines that agent 130-2 is not permitted, by a policy, to receive the first message, the messaging application 120-2 refrains from delivering the content from the first message to agent 130-2.

Messaging application 120-2 performs a step 182 of delivering the content from the second message included in the composite message 162 to the agent 130-2, which is associated with the second message group. While not shown, in various embodiments, messaging application 120-2 can deliver the content from the second message to another agent 130 that is executing node 110-2 and that is associated with the second message group. While not shown, in various embodiments, messaging application 120-2 verifies that the agent 130-2 is permitted, by a policy, to receive the second message. If the messaging application 120-2 determines that agent 130-2 is not permitted, by a policy, to receive the second message, the messaging application 120-2 refrains from delivering the content from the second message to agent 130-2.

While not shown, in various embodiments, rather than including the content for the first message in plaintext, the composite message 168 includes a first encrypted message that includes the content for the first message as encrypted by a cryptographic key that is associated with the first message group. Messaging application 120-2 can extract the first encrypted message from the composite message and decrypt the first encrypted message with the cryptographic key that is associated with the first message group to generate the content for the first message for delivery to the agents 130 in the first message group. Similarly, in various embodiments, rather than including the content for the second message in plaintext, the composite message 168 includes a second encrypted message that includes the content for the second message as encrypted by a cryptographic key that is associated with the second message group. Messaging application 120-2 can extract the encrypted message from the composite message and decrypt the encrypted message with the cryptographic key that is associated with the second message group to generate the content for the second message for delivery to the agents 130 in the second message group. Examples of composite message 168 and various cryptographic operations that may be used to generate and interpret composite messages 168 are discussed in further detail in reference to FIGS. 3A and 3B.

As previously discussed, in various embodiments, a messaging application 120 receives a request from an agent 130 to create a message group, and in response, the messaging application 120 creates the message group. The messaging application 120 can also add or subscribe the agent 130 to the created message group without requiring a separate request 150 from the agent 130 to join the created message group. A messaging application 120 can verify that a policy permits the agent 130 to create the message group. In response to a determination that the policy does not permit the agent 130 to create the message group, the messaging application 120 can refrain from creating the message group.

In various embodiments, the policy used by the first messaging application 120-1 is indicated by a policy file that is stored by the first node 110-1 and accessible to the first messaging application 120-1. The policy file can be associated with the first agent 130-1. Alternatively or additionally, in various embodiments, the policy used by the second messaging application 120-2 is indicated by a policy file that is stored by the second node 110-2 and accessible to the second messaging application 120-1. The policy file can be associated with the second agent 130-2.

In various embodiments, the policy used by at least one of the messaging applications 120-1, 120-2 includes one or more permissions, such as a permission of an agent 130 to create message group of a message group type, a permission of an agent 130 to join one or more message groups, a permission of the agent 130 to receive messages for one or more message groups, and/or a permission of an agent 130 to transmit messages to one or more message groups. The policy can include one or more rules, wherein each rule includes one or more permissions and one or more criteria by which a messaging application 120 determines whether an agent 130 is granted the permission.

In various embodiments, a rule of the policy includes a permission to create a message group and a criterion that indicates one or more message group types of message groups that can be created. For example (without limitation), the message group type can include a message group that is associated with a particular client or a message group in which exchanged messages include a particular type of data or information. The messaging application 120 can determine whether a particular agent 130 can create a message group based on whether the requested message group includes a message group type that is indicated by the criterion.

In various embodiments, a rule of the policy includes a permission to join a message group and a criterion that indicates an association between the agent 130 and a client. The messaging application 120 determines whether a particular agent 130 can join the message group based on whether the particular agent 130 is included in an association with the client, as indicated by the criterion. For example (without limitation), the messaging application 120 can determine whether an identifier of the particular agent 130 is included in a list of agents 130 that are associated with the client. Alternatively or additionally, the messaging application 120 can determine whether the particular agent 130 is permitted to join message groups that are of a particular message group type that is associated with the message group that the particular agent 130 has requested to join. Alternatively or additionally, the messaging application 120 can contact the client to request verification that the particular agent 130 is associated with the client.

In various embodiments, a rule of the policy includes a permission to deliver messages to a message group and a criterion that indicates a type of data or information included in a message that can be delivered to the message group. The messaging application 120 determines whether a particular message can be delivered to the message group based on whether the particular message includes data of the type of data or information indicated by the criterion, and/or based on whether the particular message includes any data that is not of the type of data or information indicated by the criterion.

In various embodiments, a messaging application 120 encrypts, with a cryptographic key, both the content for a message and additional data. For example (without limitation), the messaging application 120 can generate random data, prepend and/or append the random data to the content for the message, and encrypt both the content for the message and the random data together with the cryptographic key. Alternatively or additionally, the messaging application 120 can prepend and/or append to the content for the message a timestamp that is associated with the content for the message and/or the composite message 168. Including additional data in the encryption of the content for the message can ensure that an encryption of two identical sets of content results in two different encrypted messages. Additionally, when another messaging application 120 decrypts the encrypted message with a cryptographic key, the messaging application 120 can separate the content for the message from the prepended and/or appended additional data that is in the decrypted message. The messaging application 120 can discard the additional data and deliver the decrypted content for the message to one or more agents 130.

In various embodiments, a messaging application 120 encrypts the content for a message with a cryptographic key based on an encryption initialization vector. For example (without limitation), the messaging application 120 can generate the initialization vector for a composite message 168 and can initialize a cryptographic function with the encryption initialization vector. When the cryptographic function is initialized using different encryption initialization vectors, the cryptographic function generates different encrypted messages from the same content. The messaging application 120 can encrypt the content for one or more messages based on a cryptographic function that has been initialized using the encryption initialization vector. The messaging application 120 can include the encryption initialization vector in the composite message 168. Additionally, when another messaging application 120 receives a composite message 168, the messaging application 120 can extract the encryption initialization vector from the composite message 168, initialize the cryptographic function with the encryption initialization vector. The messaging application 120 can then decrypt one or more encrypted messages from the composite message 168 using the cryptographic function that has been initialized using the same encryption initialization vector by which the encrypted messages of the composite message 168 was generated.

Figure 2A:
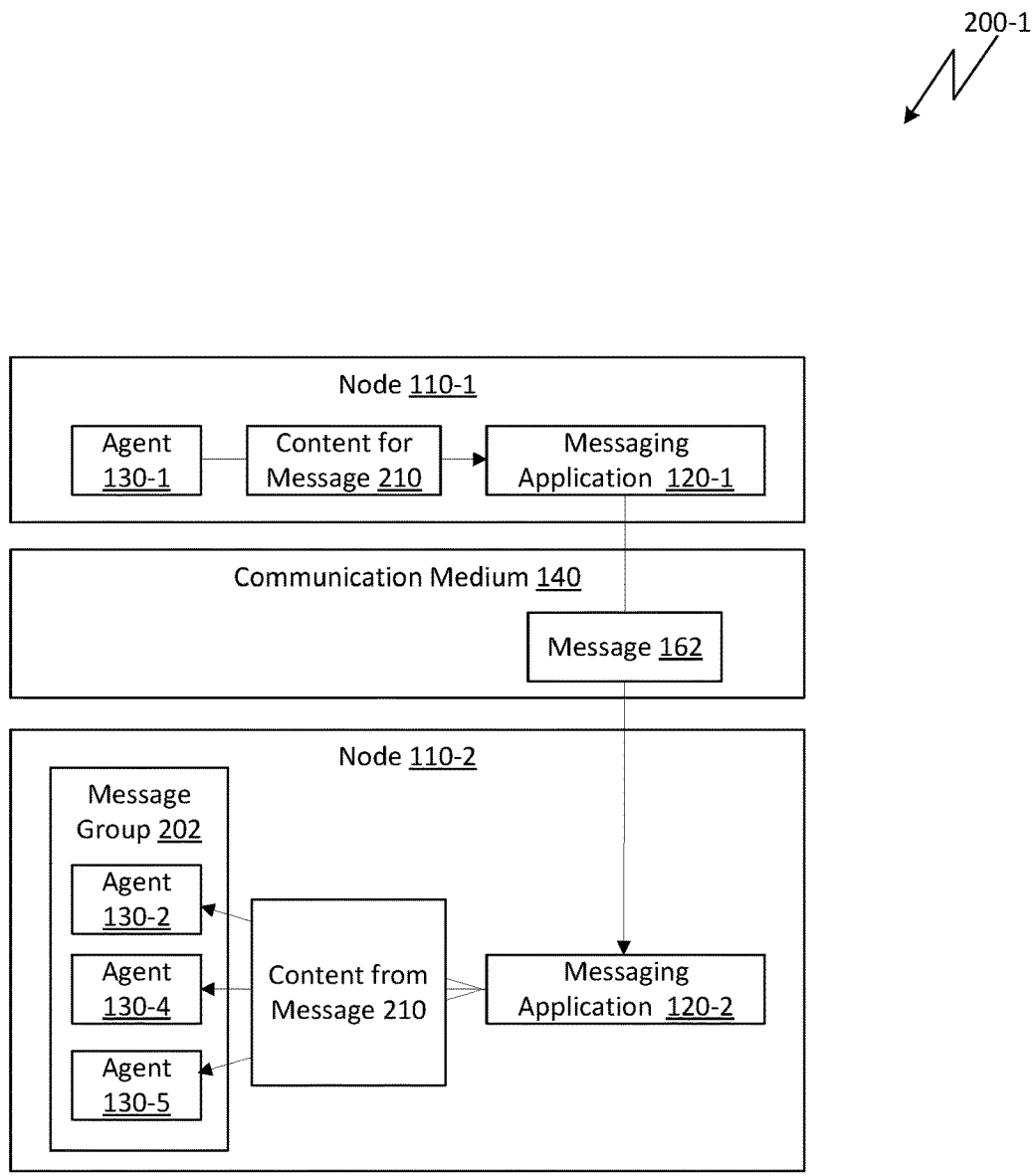
FIG. 2A illustrates an example of messaging among nodes of a mesh network by messaging applications, according to various embodiments.

FIG. 2A illustrates an example of messaging 200-1 among nodes of a mesh network by messaging applications, according to various embodiments. And although FIG. 2A is described using the messaging applications 120-1, 120-2 of FIGS. 1A-1C, any other technically feasible messaging application capable of performing the described operations can be used. Some elements shown in FIG. 2A can be interchanged with like numbered elements from other figures.

As shown, the messaging includes one-to-one unicast messaging between an agent 130-1 executed by a first node 110-1 of the mesh network and a message group 202 including a plurality of agents 130-2, 130-4, 130-5 executed by a second node 110-2 of the mesh network. Agent 130-1, executed by a first node 110-1 of the mesh network, generates content for a message 210 for the message group 202. Agent 130-1 provides the content for the message 210 to a messaging application 120-1 executed by the first node 110-1. Messaging application 120-1 transmits the content for the message 210, via the communication medium 140, to a messaging application 120-2 executing on the second node 110-2 of the mesh network. The second node 110-2 delivers the content from the message 210 to the plurality of agents 130-2, 130-4, 130-5 that are included in the message group 202.

The messaging 200-1 shown in FIG. 2A enables the agent 130-1 executed by the first node 110-1 to send the content for the message 210 to the message group 202 including the plurality of agents 130-2, 130-4, 130-5 executed by the second node 110-2. In various embodiments, the messaging 200-1 shown in FIG. 2A enables the agent 130-1 and the node 110-1 to transmit, to the second node 110-2, the content for the message 210 to each of the plurality of agents 130-2, 130-4, 130-5 executed by the second node 110-2, instead of requiring the agent 130-1 to transmit a copy of the content for the message 210 to each of the plurality of agents 130-2, 130-4, 130-5. As a result, the messaging 200-1 shown in FIG. 2A reduces communication overhead in transmitting the content for the message 210 to a message group 202 in one-to-one unicast messaging scenarios. Alternatively or additionally, in various embodiments, the messaging 200-1 shown in FIG. 2A enables the agent 130-1 to address the content for the message 210 to the message group 202, rather than to each of the agents 130 included in the message group 202. As a result, the messaging 200-1 shown in FIG. 2A reduces communication overhead in one-to-one unicast messaging scenarios that would otherwise be required to inform agent 130-1 of each of the agents 130 that are included in the message group 202, so that agent 130-1 could individually and particularly address the content for the message 210 to each of the other agents 130 in the message group 202.

Figure 2B:
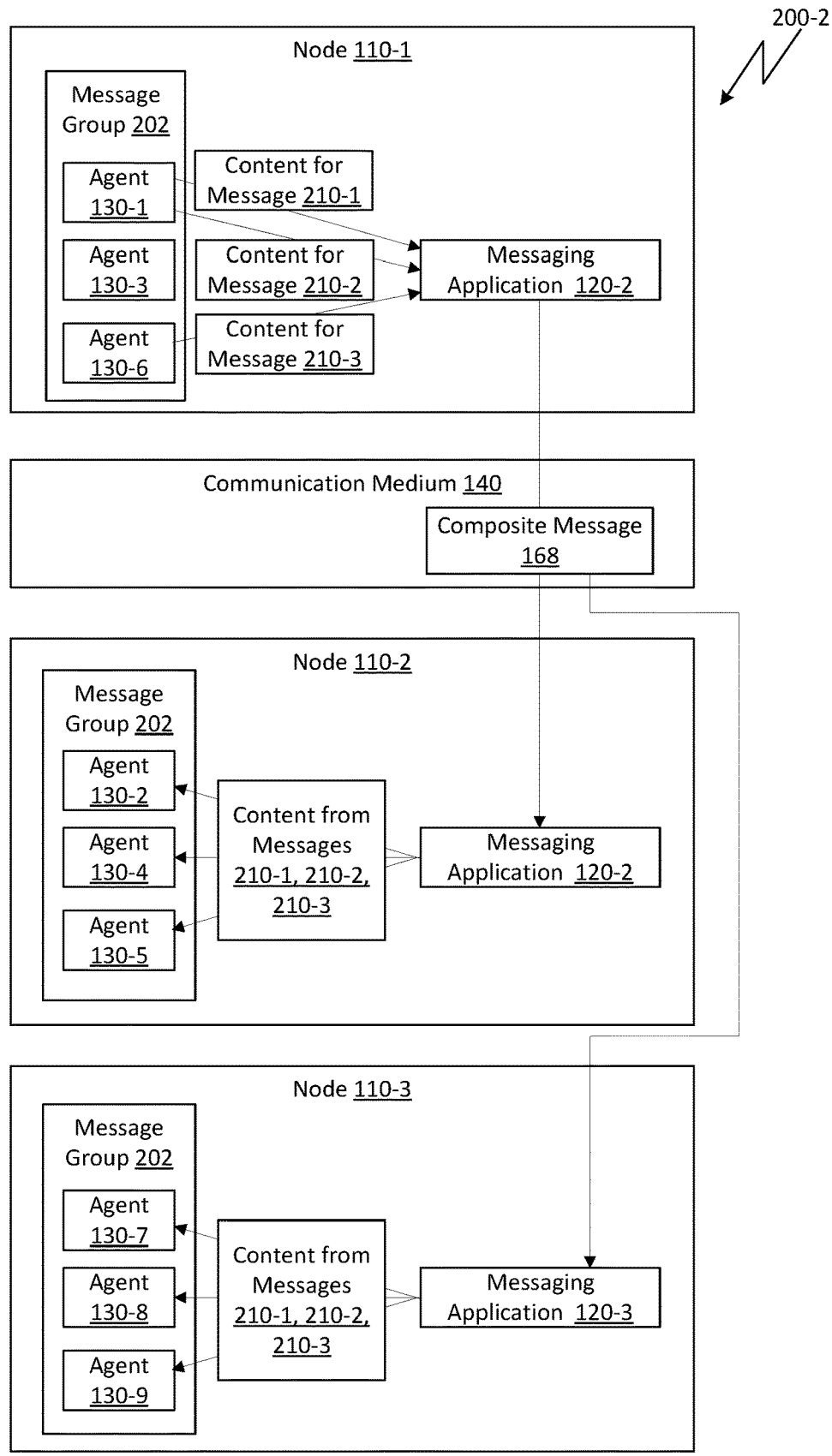
FIG. 2B illustrates another example of messaging among nodes of a mesh network by messaging applications, according to various embodiments.

FIG. 2B illustrates another example of messaging 200-2 among nodes of a mesh network by the messaging applications of FIGS. 1A-1C, according to various embodiments. And although FIG. 2B is described using the messaging applications 120-1, 120-2 of FIGS. 1A-1C, any other technically feasible messaging application capable of performing the described operations can be used. Some elements shown in FIG. 2B can be interchanged with like numbered elements from other figures.

As shown, the messaging includes one-to-many broadcast messaging between a plurality of agents 130-1, 130-3, 130-6 executed by a first node 110-1 of the mesh network and a message group 202 including agents 130-1, 130-3, 130-6 and as well as agents 130-2, 130-4, 130-5 executed by a second node 110-2 of the mesh network and agents 130-7, 130-8, 130-9 executed by a third node 110-3 of the mesh network. Agents 130-1 through 130-9 are included in a message group 202.

Agents 130-1, 130-3, 130-6, executed by a first node 110-1 of the mesh network, generate a set of content for messages 210 for the message group 202. Agent 130-1 generates content for a first message 210-1 for the message group 202 and content for a second message 210-2 for the message group 202. Agent 130-6 generates content for a third message 210-3 for the message group 202. Messaging application 120-1 receives the content for the messages 210-1, 210-2, 210-3. Messaging application 120-1 transmits content for the messages 210-1, 210-2, 210-3 in a composite message 168, via the communication medium 140, to a messaging application 120-2 executing on the second node 110-2 of the mesh network. The second node 110-2 delivers the content from the messages 210-1, 210-2, 210-3 to the plurality of agents 130-2, 130-4, 130-5 that are included in the message group 202. Messaging application 120-1 also transmits the content for the messages 210-1, 210-2, 210-3 in composite message 168, via the communication medium 140, to a messaging application 120-3 executing on the third node 110-3 of the mesh network. The third node 110-3 delivers the content from the messages 210-1, 210-2, 210-3 to the plurality of agents 130-7, 130-8, 130-9 that are included in the message group 202.

As shown, the messaging 200-2 shown in FIG. 2B enables the agents 130-1, 130-3, 130-6 executed by the first node 110-1 to send the content for the messages 210-1, 210-2, 210-3 to the message group 202 including the plurality of agents 130-2, 130-4, 130-5 executed by the second node 110-2 and the plurality of agents 130-7, 130-8, 130-9 executed by the third node 110-3. In various embodiments, the messaging 200-2 shown in FIG. 2B enables the agents 130-1, 130-3, 130-6 and the node 110-1 to transmit, to the second node 110-2 and the third node 110-3, the content for the messages 210-1, 210-2, 210-3 to the plurality of agents 130-2, 130-4, 130-5 executed by the second node 110-2 and the plurality of agents 130-7, 130-8, 130-9 executed by the third node 110-3, instead of requiring the agents 130-1, 130-3, 130-6 to transmit individual copies of each of the content for the messages 210-1, 210-2, 210-3 to each of the plurality of agents 130-2, 130-4, 130-5 executed by the second node 110-2 and the plurality of agents 130-7, 130-8, 130-9 executed by the third node 110-3. As a result, the messaging 200-2 shown in FIG. 2B reduces communication overhead in transmitting messages to a message group 202 in one-to-many broadcast messaging scenarios. Alternatively or additionally, in various embodiments, the messaging 200-2 shown in FIG. 2B enables the agents 130-1, 130-3, 130-6 to address each of the content for the messages 210-1, 210-2, 210-3 to the message group 202, rather than to each of the agents 130 included in the message group 202. As a result, the messaging 200-2 shown in FIG. 2B reduces communication overhead in one-to-many broadcast messaging scenarios that would otherwise be required to inform agents 130-1, 130-3, 130-6 of each of the agents 130 that are included in the message group 202, so that each of the agent 130-1, 130-3, 130-6 could individually and particularly address each of the content for the messages 210-1, 210-2, 210-3 to each of the other agents 130 in the message group 202.

Figure 3A:
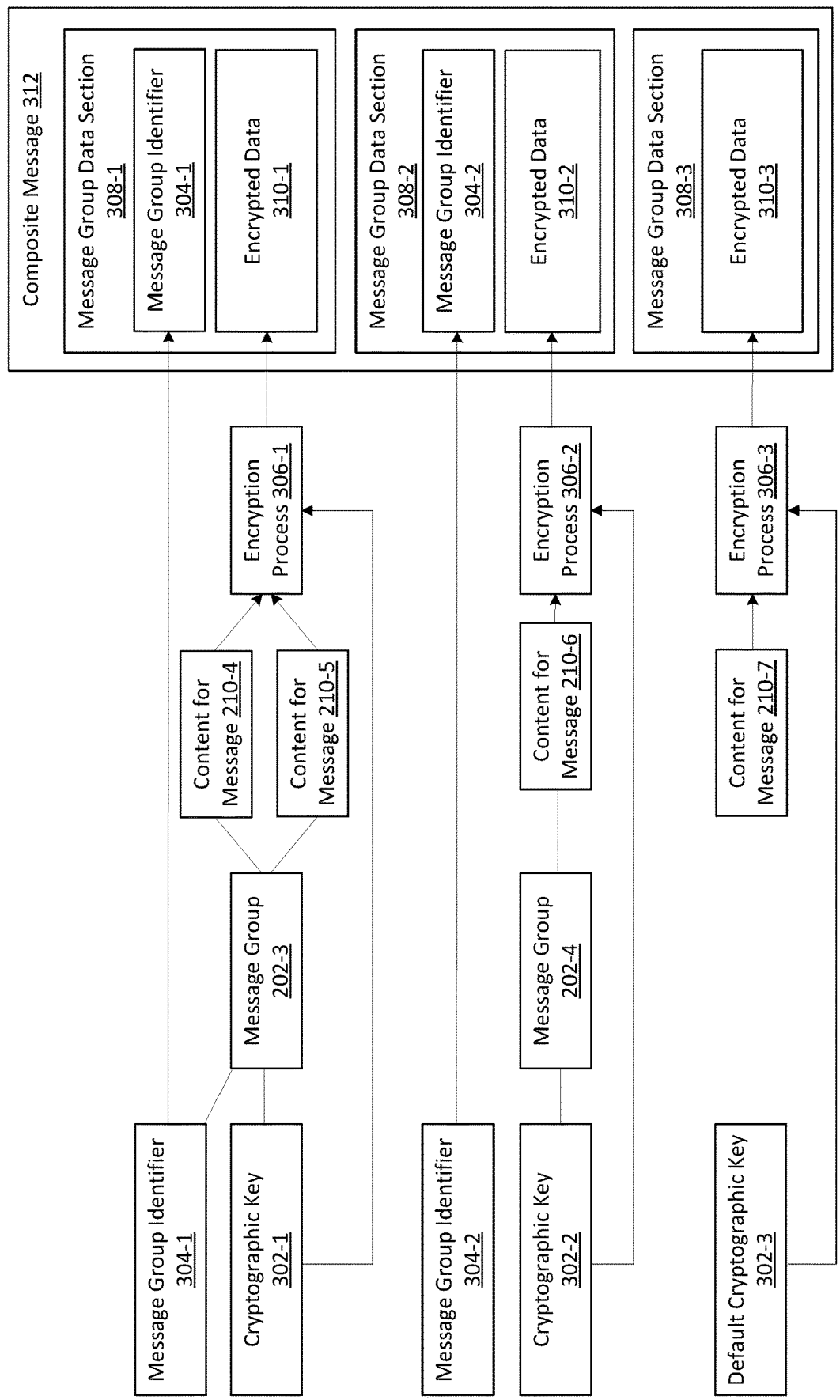
FIG. 3A illustrates an example of generating the composite message, according to various embodiments.

FIG. 3A illustrates an example of generating a composite message 312, according to various embodiments. The composite message 312 can be generated, for example, by the messaging application 120-1 of FIGS. 1A-1C and/or 2A-2B. Some elements shown in FIG. 3A can be interchanged with like numbered elements from other figures.

A messaging application 120-1 receives content for a set of messages for one or more message groups 202. Content for a first message 210-4 and content for a second message 210-5 for a first message group 202-3 and can be delivered only to agents 130 that are included in the first message group 202-3. Content for a third message 210-6 for a second message group 202-4 and can be delivered only to agents 130 that are included in the second message group 202-4. Content for a fourth message 210-7 is not for any message group 202 and can be delivered to any agent 130. The first message group 202-3 is associated with a first cryptographic key 302-1 and a first message group identifier 304-1. The second message group 202-4 is associated with a second cryptographic key 302-2 and a second message group identifier 304-2. A default cryptographic key 302-3 is not associated with either of the message groups 202-3, 202-4. In various embodiments, each of the cryptographic keys 302-1, 302-2, 302-3 includes a symmetric cryptographic key and/or a public portion of an asymmetric cryptographic key. In various embodiments, the messaging application 120-1 uses the cryptographic keys with a cryptographic function, which can be initialized using an encryption initialization vector. For example (without limitation), the messaging application 120-1 can generate the encryption initialization vector for the composite message 312 and initialize the cryptographic function with the generated encryption initialization vector.

The messaging application 120 generates a first message group data section 308-1 for the content for the first message 210-4 and the content for the second message 210-5 for the first message group 202-3. The messaging application 120 performs a first encryption process 306-1 that encrypts the content for the first message 210-4 and the content for the second message 210-5 with the first cryptographic key 302-1 to generate first encrypted data 310-1. The messaging application 120 stores, in the first message group data section 308-1, the first message group identifier 304-1 that identifies the first message group 202-3, and the first encrypted data 310-1.

The messaging application 120 generates a second message group data section 308-2 for the content for the third message 210-6 for the second message group 202-4. The messaging application 120 performs a second encryption process 306-2 that encrypts the content for the third message 210-6 with the second cryptographic key 302-2 to generate second encrypted data 310-2. The messaging application 120 stores, in the second message group data section 308-2, the second message group identifier 304-2 that identifies the second message group 202-4 and the second encrypted data 310-2.

The messaging application 120 generates a third message group data section 308-3 for the content for the fourth message 210-7 that is not for any message group 202. The messaging application 120 performs a third encryption process 306-3 that encrypts the content for the fourth message 210-7 with the default cryptographic key 302-3 to generate third encrypted data 310-3. The messaging application 120 stores, in the third message group data section 308-3, the third encrypted data 310-3. The third message group data section 308-3 omits a message group identifier 304-2 to indicate that the content for the fourth message 210-7 included in the encrypted data 310-3 is not for any message group 202. In various embodiments, a numeric indicator of the message group type of a message group 202 is encoded in a message group identifier 304 of the message group 202 (e.g., as the most significant bits of the message group identifier 304 and/or as a least significant bits portion of the message group identifier 304).

The messaging application 120-1 generates the composite message 312 that includes the message group data sections 308-1, 308-2, 308-3. In various embodiments, composite message 312 may be unencrypted in which the content for various messages is included in plaintext. In other embodiments, however, composite message 312 includes one or more encrypted sections (e.g., encrypted versions of the content for the messages). For example, in some embodiments, at least one of the message group data sections 308 includes an unencrypted header and an encrypted payload. The unencrypted header can include the message group identifier 304-1 of the message group 202 associated with the message group data section 308. The encrypted payload can include the encrypted data 310 that includes the encrypted the content for the messages for the message group 202 associated with the message group data section 308. The composite message 312 can include additional data, such as (without limitation) a timestamp and/or an encryption initialization vector that was used during at least one encryption process 306.

Figure 3B:
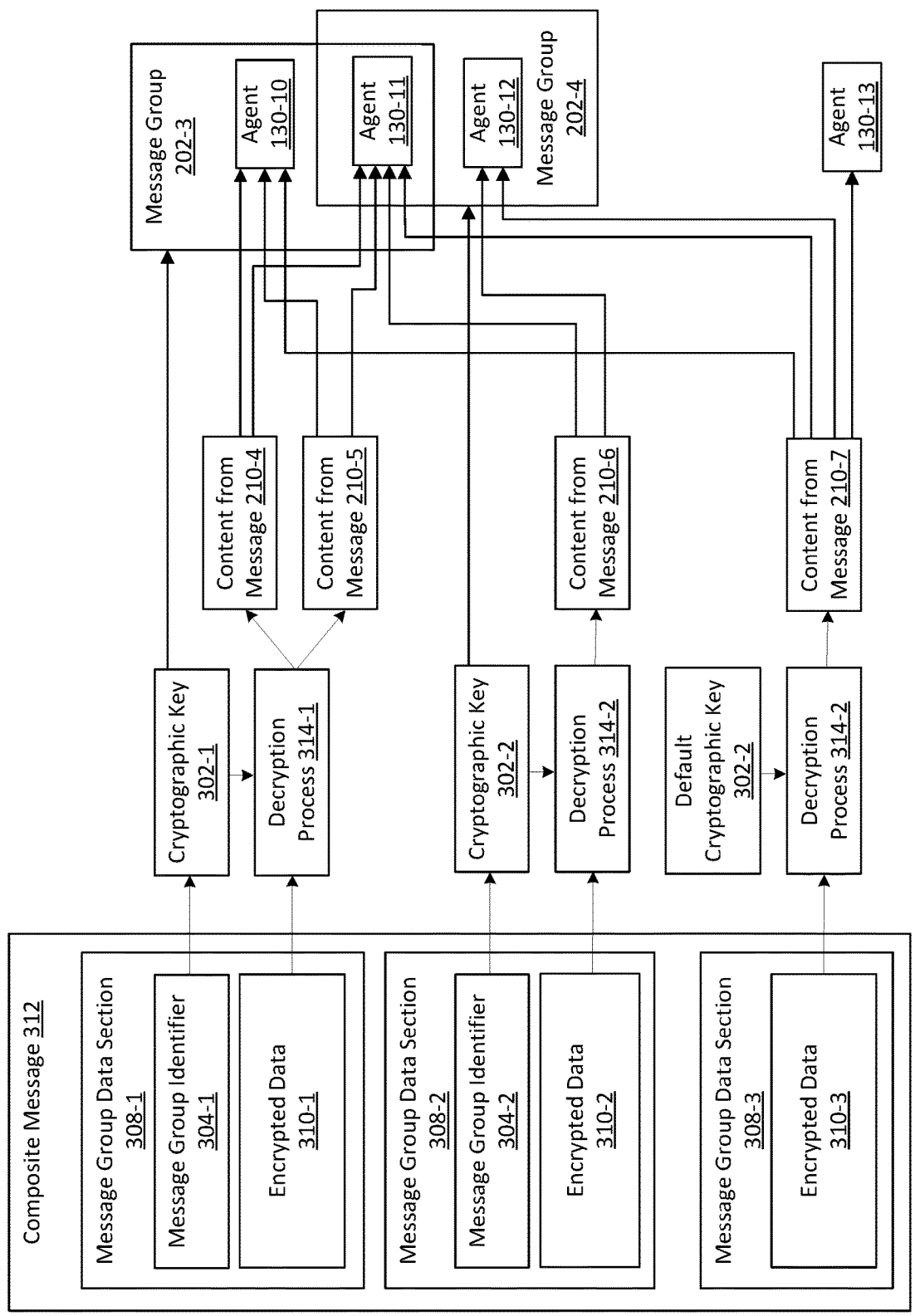
FIG. 3B illustrates an example of delivering messages in a composite message, according to various embodiments.

FIG. 3B illustrates an example of delivering a composite message 312, according to various embodiments. Some elements shown in FIG. 3B can be interchanged with like numbered elements from other figures.

As shown, the messages in the composite message 312 can be delivered, for example, by the messaging application 120-2 of FIGS. 1A-1C and/or 2A-2B. As shown, the composite message 312 includes a first message group data section 308-1 including a first message group identifier 304-1 associated with a first message group 202-3 and first encrypted data 310-1; a second message group data section 308-2 including a second message group identifier 304-2 associated with a second message group 202-4 and second encrypted data 310-2; and a third message group data section 308-3 including third encrypted data 310-3. A first agent 130-10 is included in the first message group 202-3. A second agent 130-11 is included in the first message group 202-3 and the second message group 202-4. A third agent 130-12 is included in the second message group 202-4. A fourth agent 130-13 is not included in either the first message group 202-3 or the second message group 202-4.

In various embodiments, the composite message 312 includes an encryption initialization vector. The messaging application 120-2 can extract the encryption initialization vector from the composite message 312. The messaging application 120-2 can initialize a cryptographic function with the extracted encryption initialization vector, wherein the initialized cryptographic function is used to decrypt one or more encrypted messages that are included in the composite message 312.

A messaging application 120 determines that the first message group identifier 304-1 is associated with a first message group 202-3 and a first cryptographic key 302-1. In various embodiments, the first cryptographic key 302-1 includes a symmetric cryptographic key and/or a public portion of an asymmetric cryptographic key. The messaging application 120 performs a first decryption process 314-1 using the first encrypted data 310-1 and the first cryptographic key 302-1 to generate, from the first encrypted data 310-1, the content from the first message 210-4 to the first message group 202-3 and the content from the second message 210-5 to the first message group 202-3. The messaging application 120 delivers the content for the first message 210-4 and the content from the second message 210-5 to each agent 130 that is included in the first message group 202-3, including the first agent 130-10 and the second agent 130-11.

The messaging application 120 determines that the second message group identifier 304-2 is associated with a second message group 202-4 and a second cryptographic key 302-2. In various embodiments, the second cryptographic key 302-2 includes a symmetric cryptographic key and/or a public portion of an asymmetric cryptographic key. The messaging application 120 performs a second decryption process 314-2 using the second encrypted data 310-2 and the second cryptographic key 302-2 to generate, from the second encrypted data 310-2, the content from the third message 210-6 to the second message group 202-4. The messaging application 120 delivers the content f from or the third message 210-6 to each agent 130 that is included in the second message group 202-4, including the second agent 130-11 and the third agent 130-12.

The messaging application 120 determines that the third message group data section 308-3 does not include a message group identifier 304. The messaging application 120 performs a third decryption process 314-3 using the third encrypted data 310-3 and a default cryptographic key 302-3 (i.e., a cryptographic key that is not associated with any particular message group). In various embodiments, the default cryptographic key 302-3 includes a symmetric cryptographic key and/or a public portion of an asymmetric cryptographic key. The messaging application 120 generates, from the third encrypted data 310-3, the content from the fourth message 210-7 that can be delivered to any agent 130 that is executing on the same node 110 that is executing the messaging application 120. In various embodiments, the messaging application 120 delivers the content from the fourth message 210-7 to all agents 130 executed by a node 110 that is executing the messaging application 120, including the first agent 130-10, the second agent 130-11, the third agent 130-12, and the fourth agent 130-13.

In various embodiments, the messaging application 120 retrieves a cryptographic key 302 that is associated with a message group 202 in order to decrypt encrypted data 310 that is included in the composite message 312. For example (without limitation), responsive to receiving a composite message 312 that includes encrypted data 310 that is associated with a particular message group identifier 304, the messaging application 120 can verify that the node 110 executing the messaging application 120 stores a cryptographic key 302 that is associated with the message group identifier 304. Upon verifying that the node 110 executing the messaging application 120 stores a cryptographic key 302 that is associated with the message group identifier 304, the messaging application 120 can retrieve the cryptographic key 302 from the node 110 and decrypt the encrypted data 310 using the cryptographic key 302. Upon failing to verify that the node 110 executing the messaging application 120 stores a cryptographic key 302 that is associated with the message group identifier 304, the messaging application 120 can request such a cryptographic key 302 from a key store. The key store can be included in the same node 110 that executes the messaging application 120 or in another node 110 of the mesh network. Upon receiving the cryptographic key 302 from the key store, the messaging application 120 can store the cryptographic key 302 in the node 110 executing the messaging application 120 and decrypt the encrypted data 310 using the cryptographic key 302.

In various embodiments, prior to decrypting encrypted data 310 that is associated with a message group 202, the messaging application 120 first verifies that at least one agent 130 executed by the node 110 is included in the message group 202. In response to a determination that at least one agent 130 executed by the node 110 is not included in the message group 202, the messaging application 120 refrains from decrypting the encrypted data 310.

Figure 4:
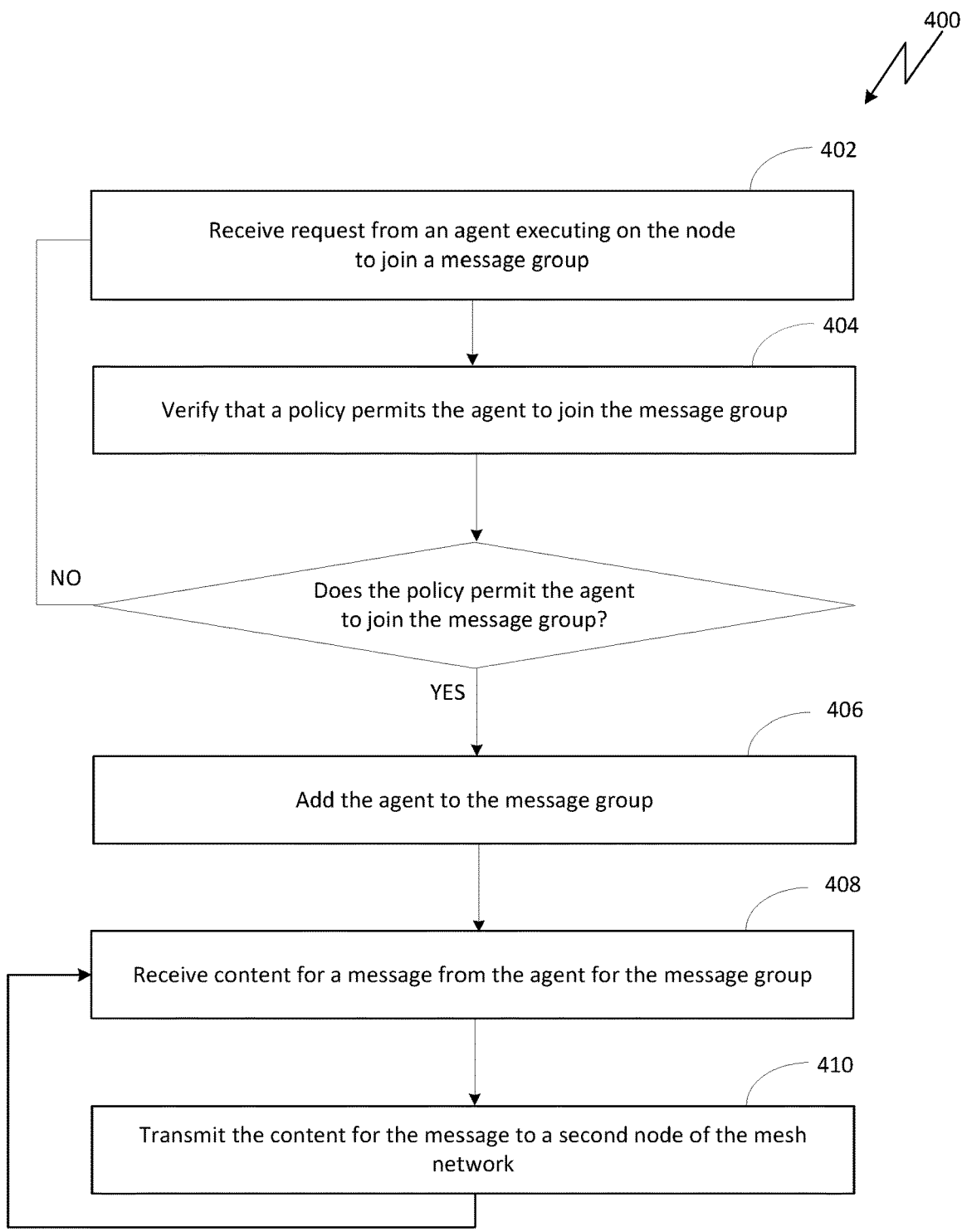
FIG. 4 is a flow diagram of method steps for transmitting messages by a messaging application executing on a node, according to various embodiments.

FIG. 4 is a flow diagram of method steps for transmitting messages by a messaging application executing on a node, according to various embodiments. The method steps of FIG. 4 can be performed, for example, by the first messaging application 120-1 executing on the first node 110-1 of FIG. 1B. The method steps of FIG. 4 can be performed, for example, during the messaging 200-1 shown in FIG. 2A and/or the messaging 200-2 shown in FIG. 2B.

As shown, a method 400 begins at step 402 in which the messaging application receives a request from an agent executing on the node to join a message group. In various embodiments, the request also includes a request to create the message group of a message group type.

At step 404, the messaging application verifies that a policy permits the agent to join the message group. In various embodiments, the messaging application determines whether the policy permits the particular agent to join the message group. In various embodiments, the messaging application determines whether the policy permits the particular agent to join message groups of a message group type that is associated with the message group that the particular agent has requested to join. In various embodiments, the messaging application determines whether the policy permits the particular agent to receive messages including a type of data or information that is included in messages for the message group that the particular agent has requested to join. If the policy does not permit the agent to join the message group, the method 400 returns to step 402. If the policy permits the agent to join the message group, the method 400 proceeds to step 406.

At step 406, the messaging application adds (or subscribes) the agent to the message group. In various embodiments, the messaging application updates a list stored by the messaging application that indicates the agents executed by the node that are included in the message group.

At step 408, the messaging application receives, from the agent, content for a message for the message group. In various embodiments, the content for the message is addressed to the message group, and/or the message includes one or more types of data or information that can be delivered to the message group. In various embodiments, the content for the message is associated with a message group identifier that identifies the message group.

At step 410, the messaging application transmits the content for the message to a second node of the mesh network. In various embodiments, the messaging application transmits the content for the message to the message group to the second node in plaintext. In various embodiments, the messaging application encrypts the content for the message with a cryptographic key that is associated with the message group to generate an encrypted message and then transmits the encrypted the content for the messages to the second node. In various embodiments, the messaging application transmits the content for the message to two or more other nodes of the mesh network. The method 400 returns to step 408 to receive and transmit content for additional messages for the message group.

Figure 5:
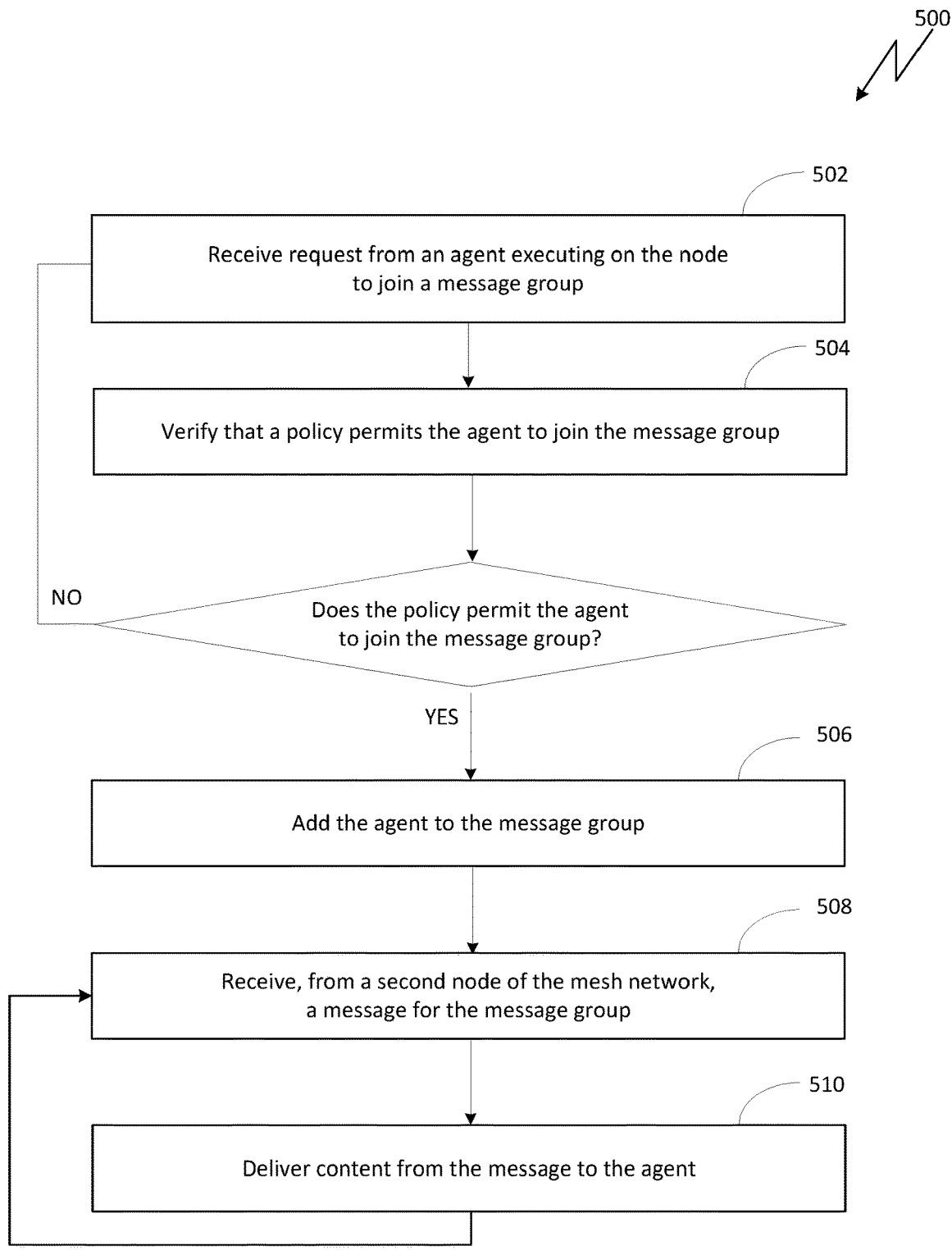
FIG. 5 is a flow diagram of method steps for delivering messages by a messaging application executing on a node, according to various embodiments.

FIG. 5 is a flow diagram of method steps for delivering messages by a messaging application executing on a node, according to various embodiments. The method steps of FIG. 5 can be performed, for example, by the second messaging application 120-2 executing on the second node 110-2 of FIG. 1B. The method steps of FIG. 5 can be performed, for example, during the messaging 200-1 shown in FIG. 2A and/or the messaging 200-2 shown in FIG. 2B.

As shown, a method 500 begins at step 502 in which the messaging application receives a request from an agent executing on the node to join a message group. In various embodiments, the request also includes a request to create the message group of a message group type.

At step 504, the messaging application verifies that a policy permits the agent to join the message group. In various embodiments, the messaging application determines whether the policy permits the particular agent to join the message group. In various embodiments, the messaging application determines whether the policy permits the particular agent to join message groups of a message group type that is associated with the message group that the particular agent has requested to join. In various embodiments, the messaging application determines whether the policy permits the particular agent to receive messages including a type of data or information that is included in messages for the message group that the particular agent has requested to join. If the policy does not permit the agent to join the message group, the method 500 returns to step 502. If the policy permits the agent to join the message group, the method 500 proceeds to step 506.

At step 506, the messaging application adds (or subscribes) the agent to the message group. In various embodiments, the messaging application updates a list stored by the messaging application that indicates the agents executed by the node that are included in the message group.

At step 508, the messaging application receives, from a second node of the mesh network, a message for the message group. In various embodiments, the message is addressed to the message group, and/or the message includes content associated with one or more types of data or information that can be delivered to the message group. In various embodiments, the message includes a message group identifier that is associated with the message group. In various embodiments, the messaging application receives, from the second node, an encrypted message, and decrypts the encrypted message with a cryptographic key that is associated with the message group to generate the message.

At step 510, the messaging application delivers content from the message to the agent. In various embodiments, the content from the message is included in a composite message that also includes content from a second message for a second message group, and the messaging agent delivers the content from the second message to an agent executing on the node that is included in the second message group. The method 500 returns to step 508 to receive and deliver additional messages for the message group.

Figure 6:
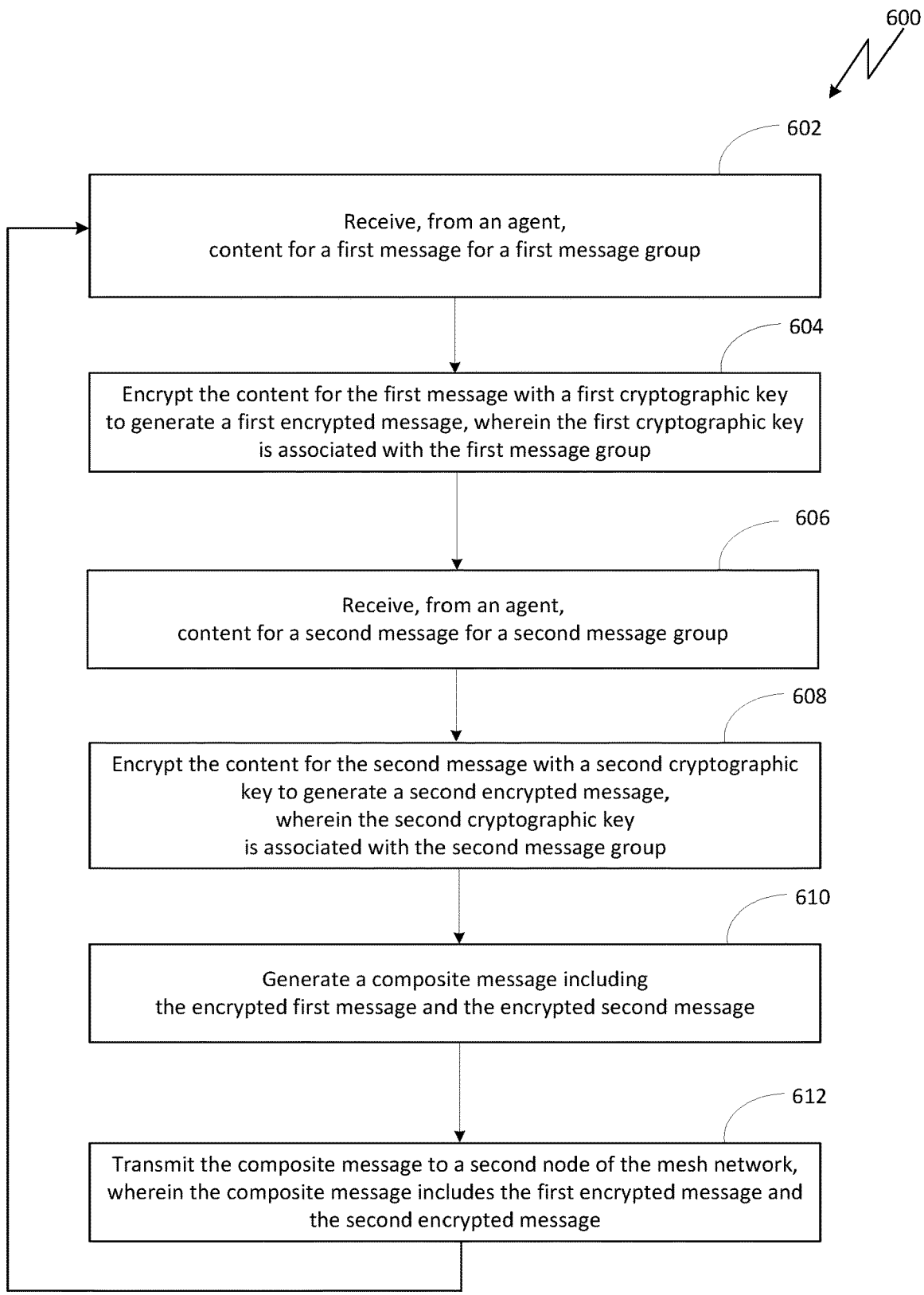
FIG. 6 is another flow diagram of method steps for transmitting messages by a messaging application executing on a node, according to various embodiments.

FIG. 6 is a flow diagram of method steps for transmitting composite messages by a messaging application executing on a node, according to various embodiments. The method steps of FIG. 6 can be performed, for example, by the first messaging application 120-1 executing on the first node 110-1 of FIG. 1C. The method steps of FIG. 6 can be performed, for example, during the messaging 200-1 shown in FIG. 2A, the messaging 200-2 shown in FIG. 2B, and/or generating the composite message 162 as shown in FIG. 3A.

As shown, a method 600 begins at step 602 in which the messaging application receives, from an agent, content for a first message for a first message group. In various embodiments, the content for the first message is addressed to the first message group, and/or the content for the first message includes one or more types of data or information that can be delivered to the first message group. In various embodiments, the content for the first message is associated with a message group identifier that identifies the first message group. In various embodiments, the messaging agent verifies that the agent is permitted, by a policy, to deliver messages to the first message group.

At step 604, the messaging application encrypts the content for the first message with a first cryptographic key to generate a first encrypted message, wherein the first cryptographic key is associated with the first message group. In various embodiments, the messaging application obtains the first cryptographic key associated with the first message group from a key store. In various embodiments, the messaging application encrypts the first message with the first cryptographic key based on a cryptographic function that is initialized with an encryption initialization vector. In various embodiments, the messaging application encrypts, with the first cryptographic key, the content for the first message and additional data, such as (without limitation) random data and/or a timestamp.

At step 606, the messaging application receives, from an agent, content for a second message for a second message group. In various embodiments, the content for the second message is addressed to the second message group, and/or the content for the second message includes one or more types of data or information that can be delivered to the second message group. In various embodiments, the content for the second message is associated with a message group identifier identifies the second message group. In various embodiments, the messaging application receives both the content for the first message and the content for the second message from the same agent or from different agents. In various embodiments, the messaging agent verifies that the agent is permitted, by a policy, to deliver messages to the second message group.

At step 608, the messaging application encrypts the content for the second message with a first cryptographic key to generate a second encrypted message, wherein the second cryptographic key is associated with the second message group. In various embodiments, the messaging application obtains the second cryptographic key associated with the first message group from a key store. In various embodiments, the messaging application encrypts the second message with the second cryptographic key based on a cryptographic function that is initialized with an encryption initialization vector. In various embodiments, the messaging application encrypts, with the second cryptographic key, the second message and additional data, such as (without limitation) random data and/or a timestamp.

At step 610, the messaging application generates a composite message, wherein the composite message includes the first encrypted message and the second encrypted message. In various embodiments, the composite message includes an encryption initialization vector with which a cryptographic function was initialized before encrypting one or more messages with a cryptographic key. In various embodiments, the composite message includes a third encrypted message based on a third message that is not for any message group, wherein the third encrypted message is encrypted using a default cryptographic key. In various embodiments, the composite message includes one or more message group data sections, wherein each message group data section includes a message group identifier in an unencrypted header and encrypted data, including one or more encrypted messages, in an encrypted payload.

At step 612, the messaging application transmits the composite message to a second node. In various embodiments involving one-to-many broadcast messaging, the messaging application also transmits the composite message to a third node of the message network, wherein the third node executes one or more additional agents that are associated with at least one of the message groups with which at least one message included in the composite message is associated. The method 600 returns to step 602 to receive and transmit additional composite messages.

Figure 7:
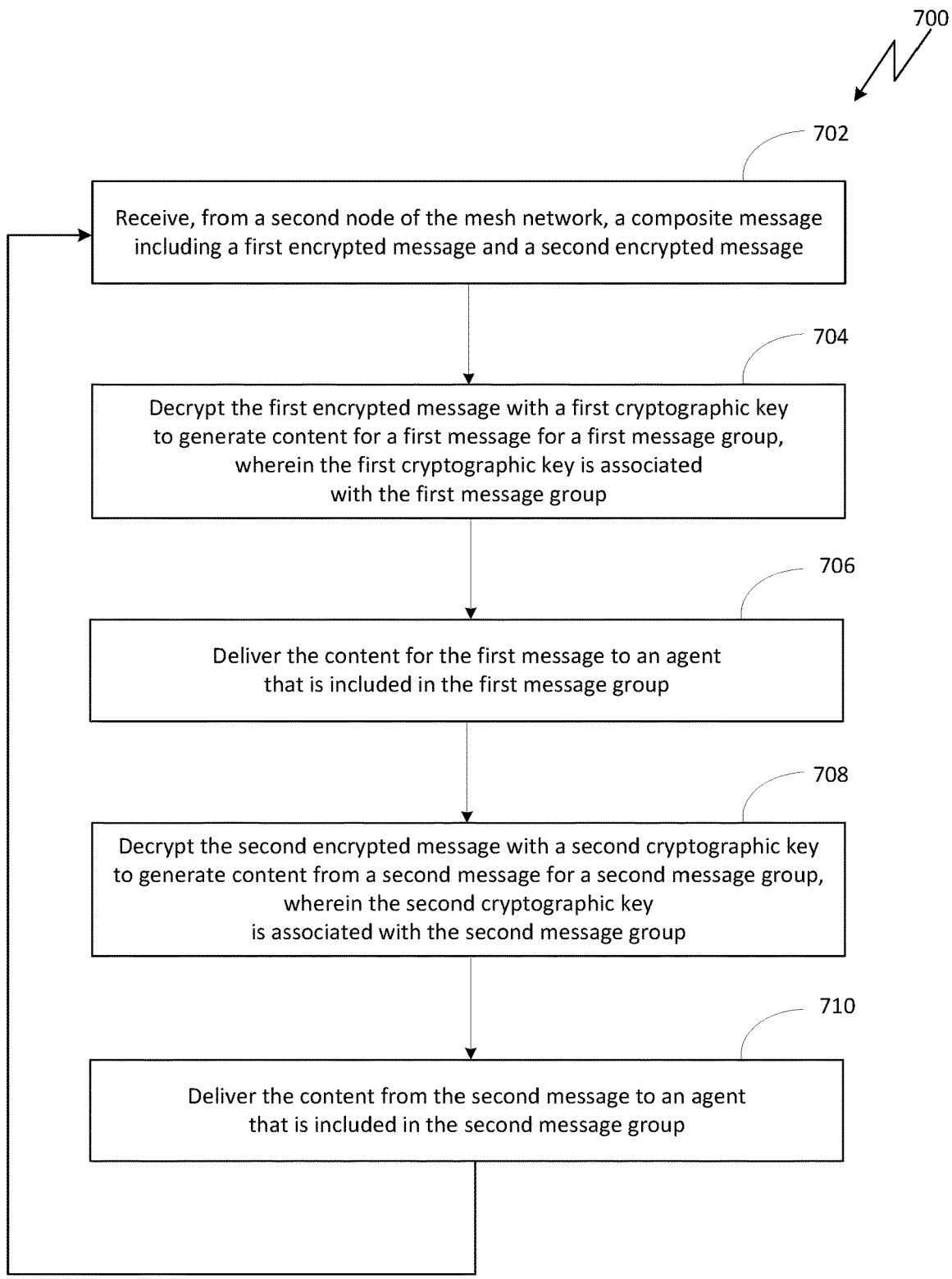
FIG. 7 is another flow diagram of method steps for delivering messages by a messaging application executing on a node, according to various embodiments.

FIG. 7 is another flow diagram of method steps for delivering composite messages by a messaging application 120 executing on a node 110, according to various embodiments. The method steps of FIG. 6 can be performed, for example, by the first node 110-1 of FIG. 1C and/or the first messaging application 120-1 executing on the first node 110-1 of FIG. 1C. The method steps of FIG. 6 can be performed, for example, during the messaging 200-1 shown in FIG. 2A, the messaging 200-2 shown in FIG. 2B, and/or delivering messages in a composite message 162 as shown in FIG. 3B.

As shown, a method 700 begins at step 702 in which the messaging application receives, from a second node of the message network, a composite message that includes a first encrypted message and the second encrypted message. In various embodiments, the composite message includes an encryption initialization vector with which a cryptographic function was initialized before encrypting one or more messages with a cryptographic key. In various embodiments, the composite message includes a third encrypted message based on a third message that is not for any message group, wherein the third encrypted message is encrypted using a default cryptographic key. In various embodiments, the composite message includes one or more message group data sections, wherein each message group data section includes a message group identifier in an unencrypted header and encrypted data, including one or more encrypted messages, in an encrypted payload.

At step 704, the messaging application decrypts the first encrypted message with a first cryptographic key to generate content for a first message for a first message group, wherein the first cryptographic key is associated with the first message group. In various embodiments, the messaging application obtains the first cryptographic key associated with the first message group from a key store. In various embodiments, the messaging application decrypts the first message with the first cryptographic key based on a cryptographic function that is initialized with an encryption initialization vector that is included in the composite message. In various embodiments, the messaging application decrypts, with the first cryptographic key, the first encrypted message to generate the content for the first message and additional data that was included in the first encrypted message, such as (without limitation) random data and/or a timestamp and separates the content for the first message from the additional data.

At step 706, the messaging application delivers the content for the first message to an agent that is included in the first message group. In various embodiments, the messaging application determines that the agent is included in the first message group based on a list stored by the node that indicates the agents executed by the node that are included in the first message group.

At step 708, the messaging application decrypts the second encrypted message with a second cryptographic key to generate content from a second message for a second message group, wherein the second cryptographic key is associated with the second message group.

At step 710, the messaging application delivers the content from the second message to an agent that is included in the second message group. In various embodiments, the messaging application determines that the agent is included in the second message group based on a list stored by the node that indicates the agents executed by the node that are included in the second message group. In various embodiments, one agent is included in both the first message group and the second group, and the messaging application delivers, to the one agent, both the first message and the second message. The method 700 returns to step 702 to receive additional composite messages and to deliver content from additional messages to agents that are included in one or more message groups.

FIG. 8 illustrates an exemplary node that can be included in a mesh network and used to implement the techniques discussed above with respect to FIGS. 1A-1C, 2A-2B, 4, and 6. Node 800 includes, without limitation, one or more processors 802, one or more input/output (I/O) devices 804, one or more transceivers 806, and a memory 808. The memory 808 includes, without limitation, a messaging application 120, an agent 130, a mailbox 810, a policy 812, and one or more cryptographic keys 820.

The node 800 is a network device and includes computing device hardware configured to perform various processing operations and execute program code. The node can further include various analog-to-digital and digital-to-analog converters, digital signal processors (DSPs), harmonic oscillators, transceivers, and any other components generally associated with RF-based communication hardware. In various embodiments, the node 800 includes a battery, renewable energy course (e.g., a solar photovoltaic array), and/or mains connection (not shown) that supplies power to the various computing device hardware included in node 800.

The one or more processors 802 can include any hardware configured to process data and execute software applications. At least one of the one or more processors 802 can include a real-time clock (RTC) (not shown) according to which processor 802 maintains an estimate of the current time. At least one of the one or more processors 802 executes an agent 130.

The one or more I/O devices 804 include devices configured to receive input, devices configured to provide output, and devices configured to both receive input and provide output. In various embodiments, the one or more I/O devices include a keyboard, a mouse, a joystick, a touchpad, a touchscreen, a microphone, an inertial measurement unit (IMU), a display, a speaker, a haptic generator, or the like.

The one or more transceivers 806 can include one more interfaces that are associated with various communication media 140. In various embodiments, the one or more transceivers include at least one of an Ethernet interface, a power line communication interface, a WiFi® interface, or a Bluetooth® interface.

The memory 808 can be implemented by any technically feasible storage medium. Memory 808 includes, without limitation, a messaging application 120 and a mailbox 810. The messaging application 120 includes program code that, when executed by the one or more processors 802, performs any of the messaging processes functionality described herein. In various embodiments, the messaging processes can include the various message processes shown in FIGS. 3A-7.

The memory 808 also includes a policy 812 that includes one or more rules 814, wherein each rule 814 indicates a permission 818 (e.g., an action) that is granted based on a fulfillment of one or more criteria one or more criteria 816. In various embodiments, the policy 812 is provided as one or more policy files stored by the node 800. The memory 808 also includes one or more mailboxes 810 that are configured to store messages.

The memory 808 further includes the one or more cryptographic keys 820. The one or more cryptographic keys 820 are usable by messaging application 120 to perform various cryptographic operations during the sending a receiving of messages that are discussed in further detail in reference to FIGS. 3A and 3B.

The agent 130 executed by the one or more processors 802 of the node 800 is operable to perform various operations. In various embodiments, the operations include monitoring, analyzing, collecting, storing, transmitting, and/or receiving data. In various embodiments, the agent 130 is stored in the memory 808 that also stores the messaging application 120.

The agent 130 sends a message to the messaging application 120, wherein the message 162 is for a message group 202. The messaging application 120 receives the message 162 from the agent 130 and determines, based on the policy 812, whether the agent 130 is permitted to deliver the message 162 to the message group 202. If the messaging application 120 determines, based on the policy 812, that the agent 130 is permitted to deliver the message 162 to the message group 202, the messaging application 120 can transmit the message 162 via the one or more transceivers 806. Agent 130 also receives, for the messages groups that agent 130 is permitted to receive messages as well as for messages that do not belong to a message group, content for messages from messaging application 120.

System Overview

Figure 9:
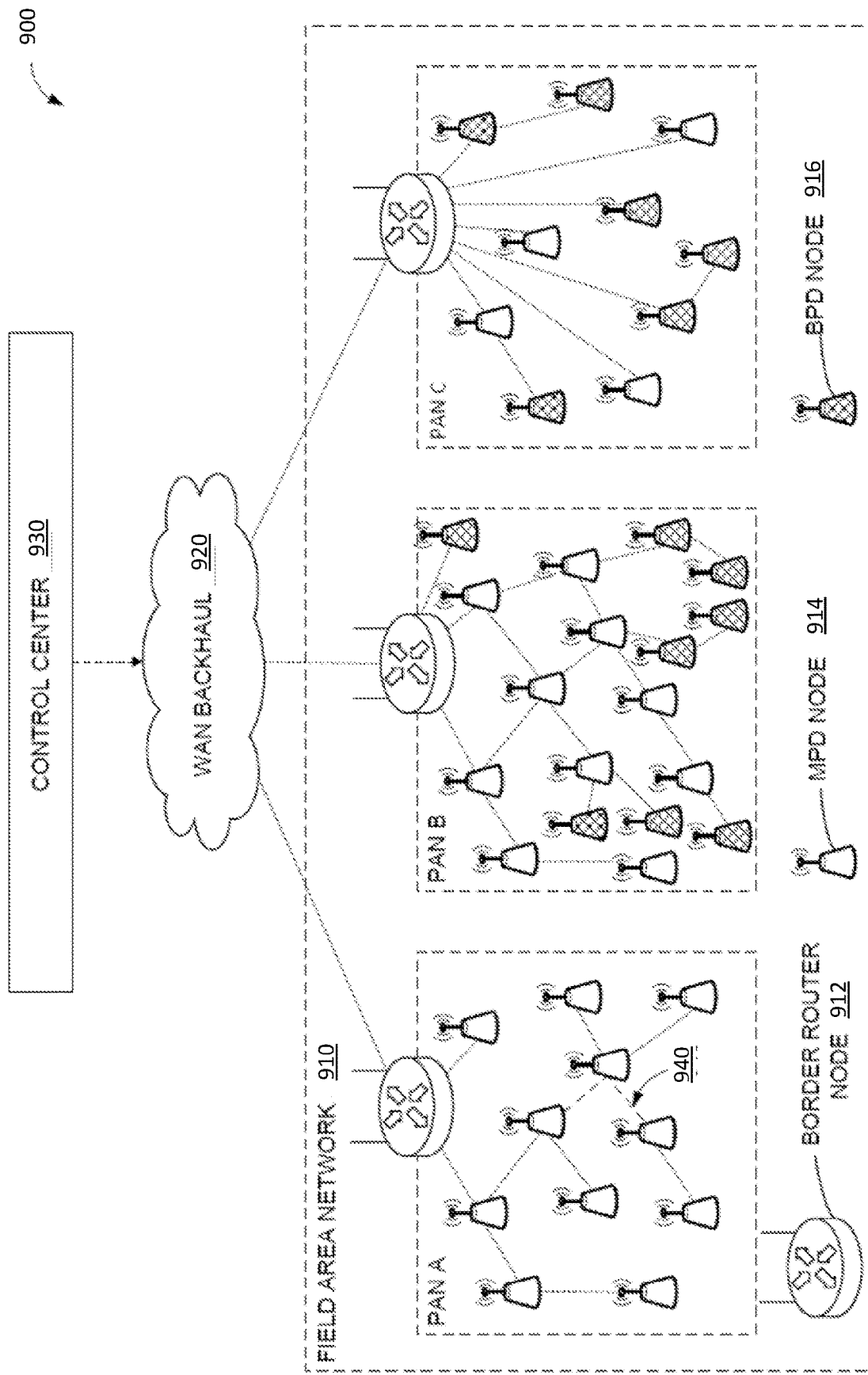
FIG. 9 illustrates a network system that includes the node of FIG. 8, configured to implement one or more aspects of the present embodiments.

FIG. 9 illustrates a network system configured to implement one or more aspects of the present embodiments. As shown, network system 900 includes a field area network (FAN) 910, a wide area network (WAN) backhaul 920, and a control center 930. FAN 910 is coupled to control center 930 via WAN backhaul 920. Control center 930 is configured to coordinate the operation of FAN 910.

FAN 910 includes personal area network (PANs) A, B, and C. PANs A and B are organized according to a mesh network topology, while PAN C is organized according to a star network topology. Each of PANs A, B, and C includes at least one border router node 912 and one or more mains-powered device (MPD) nodes 914. PANs B and C further include one or more battery-powered device (BPD) nodes 916. Any of border router node 912, the one or more MPD nodes 914, or the BPD nodes 916 can include the features of node 800 and can be used to implement the techniques discussed above with respect to FIGS. 1A-8.

MPD nodes 914 draw power from an external power source, such as mains electricity or a power grid. MPD nodes 914 typically operate on a continuous basis without powering down for extended periods of time. BPD nodes 916 draw power from an internal power source, such as a battery. BPD nodes 916 typically operate intermittently and power down, go to very low power mode, for extended periods of time in order to conserve battery power.

MPD nodes 914 and BPD nodes 916 are coupled to, or included within, a utility distribution infrastructure (not shown) that distributes a resource to consumers. MPD nodes 914 and BPD nodes 916 gather sensor data related to the distribution of the resource, process the sensor data, and communicate processing results and other information to control center 930. Border router nodes 912 operate as access points to provide MPD nodes 914 and BPD nodes 916 with access to control center 930.

Any of border router nodes 912, MPD nodes 914, and BPD nodes 916 are configured to communicate directly with one or more adjacent nodes via bi-directional communication links, such as bi-directional communication link 940. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link with the neighboring node. Each neighboring node may update a respective neighbor table to include information concerning the other node, including the MAC address of the other node as well as a received signal strength indication (RSSI) of the communication link established with that node.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across WAN backhaul 920 to control center 930. Similarly, control center 930 can transmit data packets across WAN backhaul 920 and across any given PAN to a particular node included therein. As a general matter, numerous routes can exist which traverse any of PANs A, B, and C and include any number of intermediate nodes, thereby allowing any given node or other component within network system 900 to communicate with any other node or component included therein.

Control center 930 includes one or more server machines (not shown) configured to operate as sources for, or destinations of, data packets that traverse within network system 900. The server machines can query nodes within network system 900 to obtain various data, including raw or processed sensor data, power consumption data, node/network throughput data, status information, and so forth. The server machines can also transmit commands and/or program instructions to any node within network system 900 to cause those nodes to perform various operations. In one embodiment, each server machine is a computing device configured to execute, via a processor, a messaging application stored in a memory to enable messaging among agents of the mesh network.

1. According to some embodiments, a method comprises receiving, by a first messaging application executing on a first node of a mesh network, a request from an agent executing on the first node to join a message group; verifying, by the first messaging application, that a policy permits the agent to join the message group; adding, by the first messaging application, the agent to the message group; receiving, by the first messaging application and from the agent, content for a message for the message group; and transmitting, by the first messaging application, the message to a second messaging application of a second node of the mesh network for delivery to an agent that is executing on the second node and that is included in the message group.

2. The method according to clause 1, further comprising creating, by the first messaging application, the message group in response to a request from the agent to create the message group.

3. The method according to clause 1 or clause 2, further comprising prior to the transmitting, verifying, by the first messaging application, that the policy permits the agent to deliver the message to the message group.

4. The method according to any of clauses 1-3, wherein the policy indicates at least one of a permission of the agent to create message groups of one or more message group types, a permission of the agent to join one or more message groups, or a permission of the agent to transmit messages to one or more message groups.

5. The method according to any of clauses 1-4, further comprising encrypting, by the first messaging application, the message with a cryptographic key that is associated with the message group.

6. The method according to any of clauses 1-5, wherein the transmitting includes transmitting the message and a second message for a second message group in a composite message.

7. The method according to any of clauses 1-6, wherein the content for the message is encrypted using a first cryptographic key that is associated with the message group and the content for the second message is encrypted using a second cryptographic key that is associated with the second message group.

8. According to some embodiments, a method comprises receiving, by a first messaging application executing on a first node of a mesh network, a request from an agent executing on the first node to join a message group; verifying, by the first messaging application, that a policy permits the agent to join the message group; adding, by the first messaging application, the agent to the message group; receiving, by the first messaging application and from a second messaging application executing on a second node of the mesh network, a message for the message group; and delivering, by the first messaging application, content from the message to the agent.

9. The method according to clause 8, further comprising creating, by the first messaging application, the message group in response to a request from the agent to create the message group.

10. The method according to clause 8 or clause 9, wherein the policy indicates at least one of a permission of the agent to create message groups of one or more message group types, a permission of the agent to receive messages for one or more message groups, or a permission of the agent to join one or more message groups.

11. The method according to any of clauses 8-10, further comprising decrypting, by the first messaging application, the message with a cryptographic key associated with the message group.

12. The method according to any of clauses 8-11, wherein the message is included in a composite message that also includes a second message for a second message group, and the method further comprises delivering, by the first messaging application, content from the second message to at least one agent executing on the first node that is included in the second message group.

13. According to some embodiments, one or more non-transitory computer readable media storing instructions that, when executed by one or more processors of a node of a mesh network, cause the one or more processors to execute a first messaging application performing operations comprising receiving a request from an agent executing on the node to join a first message group; determining whether the agent is permitted, by a policy, to join the first message group; in response to determining that the agent is permitted, by the policy, to join the first message group, subscribing the agent to the first message group; receiving content for a first message from the agent, wherein the first message is to be provided to one or more agents that are subscribed to the first message group; and sending the first message to a second messaging application of another node of the mesh network to be provided to one or more agents that are subscribed to the first message group.

14. The one or more non-transitory computer readable media according to clause 13, wherein the operations further comprise determining whether the policy permits the agent to provide the first message to one or more agents that are subscribed to the first message group; wherein the sending is performed in response to a determination that the policy permits the agent to provide the first message to one or more agents that are subscribed to the first message group.

15. The one or more non-transitory computer readable media according to clause 13 or clause 14, wherein the policy indicates at least one of a permission of the agent to create message groups of one or more message group types, a permission of the agent to subscribe to one or more message groups, or a permission of the agent to send messages to one or more message groups.

16. The one or more non-transitory computer readable media according to any of clauses 13-15, wherein the operations further comprise generating a cryptographically encoded message based on the first message and a cryptographic key that is associated with the first message group, wherein the first messaging application sends the cryptographically encoded message to the second messaging application.

17. The one or more non-transitory computer readable media according to any of clauses 13-16, wherein the operations further comprise receiving content for a second message, wherein the second message is to be provided to one or more agents that are subscribed to the first message group; receiving content for a third message, wherein the third message is to be provided to one or more agents that are subscribed to a second message group; generating a composite message including the second message and the third message; and sending the composite message to the second messaging application.

18. The one or more non-transitory computer readable media according to any of clauses 13-17, wherein the first message is encrypted using a first cryptographic key that is associated with the first message group, and the second message is encrypted using a second cryptographic key that is associated with the second message group.

19. The one or more non-transitory computer readable media according to any of clauses 13-18, wherein the operations further comprise obtaining, from a messaging application executing on another node of the mesh network, a second message, wherein the second message is to be provided to one or more agents that are subscribed to the first message group and providing, by the first messaging application, content from the second message to the agent.

20. The one or more non-transitory computer readable media according to any of clauses 13-19, wherein the operations further comprise obtaining, from a messaging application executing on another node of the mesh network, a cryptographically encoded message; generating a second message based on the cryptographically encoded message and a cryptographic key associated with the first message group; and providing content from the second message to one or more agents executing on the node that are subscribed to the first message group.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present invention of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   receiving, by a first messaging application executing on a first node of a mesh network, a request from an agent executing on the first node to join a message group;
   verifying, by the first messaging application, that a policy permits the agent to join the message group;
   adding, by the first messaging application, the agent to the message group;
   receiving, by the first messaging application and from the agent, content for a message for the message group; and
   transmitting, by the first messaging application, the message to a second messaging application of a second node of the mesh network for delivery to an agent that is executing on the second node and that is included in the message group.

2. The method of claim 1, further comprising creating, by the first messaging application, the message group in response to a request from the agent to create the message group.

3. The method of claim 1, further comprising:
   prior to the transmitting, verifying, by the first messaging application, that the policy permits the agent to deliver the message to the message group.

4. The method of claim 1, wherein the policy indicates at least one of a permission of the agent to create message groups of one or more message group types, a permission of the agent to join one or more message groups, or a permission of the agent to transmit messages to one or more message groups.

5. The method of claim 1, further comprising encrypting, by the first messaging application, the message with a cryptographic key that is associated with the message group.

6. The method of claim 1, wherein the transmitting includes transmitting the message and a second message for a second message group in a composite message.

7. The method of claim 6, wherein the content for the message is encrypted using a first cryptographic key that is associated with the message group and the content for the second message is encrypted using a second cryptographic key that is associated with the second message group.

8. A method comprising:
   receiving, by a first messaging application executing on a first node of a mesh network, a request from an agent executing on the first node to join a message group;
   verifying, by the first messaging application, that a policy permits the agent to join the message group;
   adding, by the first messaging application, the agent to the message group;
   receiving, by the first messaging application and from a second messaging application executing on a second node of the mesh network, a message for the message group; and
   delivering, by the first messaging application, content from the message to the agent.

9. The method of claim 8, further comprising creating, by the first messaging application, the message group in response to a request from the agent to create the message group.

10. The method of claim 8, wherein the policy indicates at least one of a permission of the agent to create message groups of one or more message group types, a permission of the agent to receive messages for one or more message groups, or a permission of the agent to join one or more message groups.

11. The method of claim 8, further comprising decrypting, by the first messaging application, the message with a cryptographic key associated with the message group.

12. The method of claim 8, wherein the message is included in a composite message that also includes a second message for a second message group, and the method further comprises delivering, by the first messaging application, content from the second message to at least one agent executing on the first node that is included in the second message group.

13. One or more non-transitory computer readable media storing instructions that, when executed by one or more processors of a node of a mesh network, cause the one or more processors to execute a first messaging application performing operations comprising:
  receiving a request from an agent executing on the node to join a first message group;
  determining whether the agent is permitted, by a policy, to join the first message group;
  in response to determining that the agent is permitted, by the policy, to join the first message group, subscribing the agent to the first message group;
  receiving content for a first message from the agent, wherein the first message is to be provided to one or more agents that are to the first message group; and
  sending the first message to a second messaging application of another node of the mesh network to be provided to one or more agents that are subscribed to the first message group.

14. The one or more non-transitory computer readable media of claim 13, wherein the operations further comprise:
  determining whether the policy permits the agent to provide the first message to one or more agents that are subscribed to the first message group;
  wherein the sending is performed in response to a determination that the policy permits the agent to provide the first message to one or more agents that are subscribed to the first message group.

15. The one or more non-transitory computer readable media of claim 13, wherein the policy indicates at least one of a permission of the agent to create message groups of one or more message group types, a permission of the agent to subscribe to one or more message groups, or a permission of the agent to send messages to one or more message groups.

16. The one or more non-transitory computer readable media of claim 13, wherein the operations further comprise generating a cryptographically encoded message based on the first message and a cryptographic key that is associated with the first message group, wherein the first messaging application sends the cryptographically encoded message to the second messaging application.

17. The one or more non-transitory computer readable media of claim 13, wherein the operations further comprise:
  receiving content for a second message, wherein the second message is to be provided to one or more agents that are subscribed to the first message group;
  receiving content for a third message, wherein the third message is to be provided to one or more agents that are subscribed to a second message group;
  generating a composite message including the second message and the third message; and
  sending the composite message to the second messaging application.

18. The one or more non-transitory computer readable media of claim 17, wherein the first message is encrypted using a first cryptographic key that is associated with the first message group, and the second message is encrypted using a second cryptographic key that is associated with the second message group.

19. The one or more non-transitory computer readable media of claim 13, wherein the operations further comprise:
  obtaining, from a messaging application executing on another node of the mesh network, a second message, wherein the second message is to be provided to one or more agents that are subscribed to the first message group; and
  providing, by the first messaging application, content from the second message to the agent.

20. The one or more non-transitory computer readable media of claim 13, wherein the operations further comprise:
  obtaining, from a messaging application executing on another node of the mesh network, a cryptographically encoded message;
  generating a second message based on the cryptographically encoded message and a cryptographic key associated with the first message group; and
  providing content from the second message to one or more agents executing on the node that are subscribed to the first message group.

* * * * *